US008358294B2

(12) United States Patent
Matsukawa

(10) Patent No.: US 8,358,294 B2
(45) Date of Patent: Jan. 22, 2013

(54) DISPLAY DEVICE AND METHOD FOR DRIVING SAME

(75) Inventor: Toshikazu Matsukawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 614 days.

(21) Appl. No.: 12/451,165

(22) PCT Filed: Mar. 17, 2008

(86) PCT No.: PCT/JP2008/054856

§ 371 (c)(1),
(2), (4) Date: Oct. 28, 2009

(87) PCT Pub. No.: WO2009/011150

PCT Pub. Date: Jan. 22, 2009

(65) Prior Publication Data

US 2010/0123738 A1 May 20, 2010

(30) Foreign Application Priority Data

Jul. 18, 2007 (JP) ................................. 2007-187067

(51) Int. Cl.
*G06F 3/038* (2006.01)
*G09G 5/00* (2006.01)

(52) U.S. Cl. ........................... 345/204; 345/89; 345/690

(58) Field of Classification Search ........................ None
See application file for complete search history.

(56) References Cited

U.S. PATENT DOCUMENTS 5,489,910 A * 2/1996 Kuwata et al. ................ 345/212
7,253,797 B2 * 8/2007 Lee et al. ........................ 345/89
2002/0126112 A1 9/2002 Kato
2002/0190938 A1 12/2002 Yamada
2003/0048248 A1 3/2003 Fukumoto et al.
2004/0183707 A1 9/2004 Lee et al.
2004/0227775 A1 * 11/2004 Shimizu et al. ............... 345/690
2005/0017965 A1 1/2005 Morita et al.
2005/0024311 A1 2/2005 Takahashi et al.
2005/0122300 A1 * 6/2005 Makuuchi et al. .............. 345/95
2005/0231497 A1 * 10/2005 Harada ......................... 345/204
2006/0279498 A1 12/2006 Kaneda et al.
2007/0171163 A1 * 7/2007 Miyata ........................... 345/87
2007/0262972 A1 11/2007 Nakata
2008/0180365 A1 * 7/2008 Ozaki ............................ 345/76

FOREIGN PATENT DOCUMENTS

JP 03-059595 3/1991
JP 10-333648 12/1998
JP 2002-99261 4/2002

(Continued)

*Primary Examiner* — Amare Mengistu
*Assistant Examiner* — Antonio Xavier
(74) *Attorney, Agent, or Firm* — Harness, Dickey & Pierce

(57) ABSTRACT

A display device configured to correct gamma characteristics in a simplified and expeditious manner upon renewal of a display portion and a method for driving the same. The display device has a source driver supplied with tentative gradation reference voltages generated by a voltage dividing circuit having a plurality of resistances connected in series. The source driver generates a tentative gradation voltage group based on the tentative gradation reference voltages. Upon a power supply circuit start up, gradation voltage data supplied from a display control circuit is subjected to D/A conversion by a D/A converter, so that normal gradation reference voltages are generated. The normal gradation reference voltages are supplied to the source driver in place of the tentative gradation reference voltages. Thereafter, the source driver generates normal gradation voltages based on the normal gradation reference voltages in place of the tentative gradation voltages.

12 Claims, 10 Drawing Sheets

FOREIGN PATENT DOCUMENTS

| | | |
|---|---|---|
| JP | 2002-258816 | 9/2002 |
| JP | 2003-84725 | 3/2003 |
| JP | 2004-280063 | 10/2004 |
| JP | 2005-43435 | 2/2005 |
| JP | 2005-049418 | 2/2005 |
| JP | 2005-234495 | 9/2005 |
| JP | 2007/266154 | 9/2005 |

* cited by examiner

DISPLAY DEVICE AND METHOD FOR DRIVING SAME

TECHNICAL FIELD

The present invention relates to display devices and methods for driving the same, and particularly, the invention relates to an active-matrix display device for providing a gradation display and a method for driving the same.

BACKGROUND ART

Active-matrix liquid crystal display devices are capable of providing a color or black and white gradation display in accordance with an inputted video signal, and therefore have been used until now for notebook computers and computer monitors. However, in recent years, as they offer an increased number of tones and enhanced resolution, they have been also used for electronic appliances, such as cell phones, car navigation systems, and television receivers.

FIG. 9 is a block diagram illustrating the overall configuration of a conventional active-matrix liquid crystal display device used in such an electronic appliance. As shown in FIG. 9, the liquid crystal display device includes a liquid crystal panel (display portion) 100 having a number of pixel formation portions arranged in a matrix, a display control circuit 200, a gate driver (scanning signal line drive circuit) 300, a source driver (video signal line drive circuit) 400, a reference voltage generation circuit 500, a common electrode drive circuit 600, and a power supply voltage generation circuit 700.

The liquid crystal panel 100 has a liquid crystal layer sandwiched between two opposing insulation substrates. On one substrate, gate bus lines (scanning signal lines) GL and source bus lines (video signal lines) SL are arranged in a matrix, and pixel formation portions are provided in the vicinity of their intersections. The pixel formation portions each include a pixel electrode Ep and a common electrode Ec, in which the pixel electrode is connected to the source bus line SL via a TFT (Thin Film Transistor) 10, and the common electrode is disposed on the other substrate.

Liquid crystals, when having direct-current voltage continuously applied thereto, solidify in a certain direction and become immobile, leading to the "burn-in" phenomenon. Accordingly, in order for liquid crystals not to experience the "burn-in" phenomenon, it is necessary to perform alternating-current drive in which the pixel electrode Ep repeatedly alternates in predetermined cycles between potentials higher and lower than a voltage VCOM at the common electrode Ec.

The display control circuit 200 generates various timing control signals and a digital video signal DV in order to operate the gate driver 300, the source driver 400, and the common electrode drive circuit 600, based on image data DAT and a timing control signal TS, which are transmitted externally.

When the display control circuit 200 outputs timing control signals GCK and GSP to the gate driver 300, the gate driver 300 sequentially selects each gate bus line GL for one horizontal period based on the received timing control signals GCK and GSP, and outputs an active scanning signal to the selected gate bus line GL. Also, the display control circuit 200 outputs to the source driver 400 the externally transmitted image data DAT as a digital video signal DV representing video to be displayed, along with timing control signals SCK, SSP, and LS.

The source driver 400 converts the digital video signal DV received from the display control circuit 200 into a drive video signal, which is an analog video signal, via a selector (also referred to as a "D/A converter"). Concretely, the selector selects a drive video signal in order to perform alternating-current drive on the liquid crystal layer, from among two types of analog voltages (hereinafter, referred to as "gradation voltages") generated for gradation display based on two types of gradation reference voltages VH1 to VH3 and VL1 to VL3 inputted from the reference voltage generation circuit 500, the gradation voltages being alternatingly selected in accordance with the digital video signal DV. The source driver 400 applies the drive video signal obtained by the conversion to the pixel electrode Ep via the source bus line SL at times determined by the timing control signals SCK, SSP, and LS.

On the other hand, the common electrode drive circuit 600 applies the common voltage VCOM to the common electrode Ec. As a result, a pixel capacitance consisting of the pixel electrode Ep and the common electrode Ec is charged with the common voltage VCOM and the voltage supplied by the drive video signal applied to the pixel electrode Ep, so that desired video is displayed on the liquid crystal panel 100.

The power supply voltage generation circuit 700, when having a reference voltage of 12 volts externally applied thereto, generates and outputs a power supply voltage for each circuit via an internal DC/DC converter. Note that FIG. 9 shows only an analog power supply voltage VLS and a base gradation voltage VKB, which are included in the generated power supply voltages, with the remaining other power supply voltages being omitted.

The reference voltage generation circuit 500 includes a voltage dividing circuit 51 and operational amplifiers OP1 to OP6, in which the voltage dividing circuit extracts necessary voltages from nodes for six resistances R1 to R6 connected in a series, and the operational amplifiers are connected to their corresponding nodes in the voltage dividing circuit 51. The voltage dividing circuit 51 has applied to one terminal a base gradation voltage VKB of 15.2V from the power supply voltage generation circuit 700 with the other being grounded. The resistances R1 to R6 have their resistance values determined in accordance with gamma characteristics (the relationship between voltage applied to the liquid crystal panel and brightness) of the liquid crystal panel 100 to be used. To perform alternating-current drive on the liquid crystal layer, there are three gradation reference voltages, which are first to third gradation reference voltages VH1 to VH3 (hereinafter, referred to as "VH-side gradation reference voltages"), required for generating gradation voltages higher than the common electrode VCOM (hereinafter, referred to as "VH-side gradation voltages"), and another three gradation reference voltages, which are first to third gradation reference voltages VL1 to VL3 (hereinafter, referred to as "VL-side gradation reference voltages"), required for generating gradation voltages lower than the common electrode VCOM (hereinafter, referred to as "VL-side gradation voltages").

The first to third VH-side gradation reference voltages VH1 to VH3 and the first to third VL-side gradation reference voltages VL1 to VL3 generated by the voltage dividing circuit 51 are voltages extracted from the nodes for the resistances R1 to R6 in the voltage dividing circuit 51 and outputted to the source driver 400 via the operational amplifiers OP1 to OP6. The operational amplifiers OP1 to OP6 output the voltages inputted from the nodes for the resistances R1 to R6 after conversion into low-impedance output voltages.

To perform alternating-current drive on the liquid crystal layer, the source driver 400 requires the following equation (1), which is called the "driver's rule", to be satisfied among an analog power supply voltage VLS of 15.6V, a withstand reference voltage VBD half the analog power supply voltage, the VH-side gradation reference voltages VH1 to VH3, and the VL-side gradation reference voltages VL1 to VL3.

$$VLS>VH1 \text{ to } VH3>VBD>VL1 \text{ to } VL3>GND \quad (1)$$

In the source driver 400, when equation (1) is not satisfied, excess current flows between the terminal for the analog power supply voltage VLS and the ground terminal, so that the selector does not operate normally, resulting in no video being displayed on the liquid crystal panel 100.

Accordingly, a study is made as to whether or not equation (1) is satisfied for the VH- and VL-side gradation reference voltages VH1 to VH3 and VL1 to VL3 generated by the reference voltage generation circuit 500.

FIG. 10 is a graph illustrating over-time changes of the gradation reference voltages in the conventional art. In FIG. 10, the gradation reference voltages VH1 to VH3 and VL1 to VL3, which rise from the ground voltage GND to their respective predetermined voltage values, are represented by solid lines, and the analog power supply voltage VLS and the withstand reference voltage VBD are represented by one-dot chain lines. It is appreciated from FIG. 10 that the VH-side gradation reference voltages VH1 to VH3 always fall between the analog power supply voltage VLS and the withstand reference voltage VBD, and the VL-side gradation reference voltages VL1 to VL3 fall between the withstand reference voltage VBD and the ground voltage GND. Accordingly, it is appreciated that the gradation reference voltages VH1 to VH3 and VL1 to VL3 generated by the reference voltage generation circuit 500 always satisfy equation (1).

Therefore, even when the gradation reference voltages VH1 to VH3 and VL1 to VL3 generated by the reference voltage generation circuit 500 are applied to the source driver 400, no excess current flows between the terminal for the analog power supply voltage VLS in the source driver 400 and the ground terminal. Note that the mechanism of excess current flowing when equation (1) is not satisfied will be described later.

Japanese Laid-Open Patent Publication No. 2003-84725 discloses a reference voltage generation circuit in which a voltage dividing circuit having a plurality of resistances connected in a series performs resistive division on power supply voltage to generate gradation reference voltages. Also, Japanese Laid-Open Patent Publication No. 2005-43435 discloses a liquid crystal driver in which a sequencer is provided between an instruction driver and a power supply, and controls the timing of writing a set value to the instruction driver.

[Patent document 1] Japanese Laid-Open Patent Publication No. 2003-84725

[Patent document 2] Japanese Laid-Open Patent Publication No. 2005-43435

DISCLOSURE OF THE INVENTION

Problems to be Solved by the Invention

However, the gamma characteristics vary from one liquid crystal panel 100 to another, and therefore when the liquid crystal panel 100 is renewed, it is necessary to redesign voltage values for gradation voltages considering gamma characteristics. The gradation voltage values are determined by resistance values for resistances included in the gradation voltage generation circuit within the source driver 400, and resistance values for the resistances R1 to R6 included in the voltage dividing circuit 51 formed on the control board. To change the gradation voltage values, it is easier to change and adjust the resistance values for the resistances R1 to R6 on the control board than to change the resistance values for the resistances in the gradation voltage generation circuit.

However, to change and adjust the resistance values for the resistances R1 to R6 on the control board, it is necessary to recreate a new control board upon each renewal of the liquid crystal panel 100. Particularly, in recent years, electronic appliances having the liquid crystal display device mounted thereon have a shorter product life cycle, so that the life cycle of the liquid crystal panel 100 is shortened, which shortens the life cycle of the control board as well. As a result, time and cost required for recreating a new control board increase, which prevents improvements in the efficiency of production of the liquid crystal display device.

On the other hand, Japanese Laid-Open Patent Publication No. 2003-84725 merely describes the voltage dividing circuit using resistive division to generate gradation reference voltages, and makes no reference to any of the aforementioned problems caused by renewing the liquid crystal panel. Also, Japanese Laid-Open Patent Publication No. 2005-43435 describes driving by the liquid crystal driver using the sequencer, but makes no reference to renewal of the liquid crystal panel.

Therefore, an objective of the present invention is to provide a display device capable of correcting gamma characteristics in a simplified and expeditious manner upon renewal of a liquid crystal panel, thereby improving the efficiency of production, and also to provide a method for driving the same.

Solution to the Problems

A first aspect of the present invention is directed to an active-matrix display device for providing a gradation display of video to be displayed, comprising:

a display portion including a plurality of scanning signal lines, a plurality of video signal lines crossing the scanning signal lines, and a plurality of display elements arranged in a matrix in accordance with intersections between the scanning signal lines and the video signal lines;

a scanning signal line drive circuit for selectively activating the scanning signal lines;

a first reference voltage generation circuit for generating first gradation reference voltages immediately after the display device is powered on, the first gradation reference voltages each having a fixed voltage value;

a second reference voltage generation circuit for generating second gradation reference voltages each having a variable voltage value;

a changeover circuit for, after the generation of the second gradation reference voltages, changing over the first gradation reference voltages inputted from the first reference voltage generation circuit to the second gradation reference voltages inputted from the second reference voltage generation circuit, and outputting the second gradation reference voltages; and a video signal line drive circuit for generating gradation voltages based on either the first or second gradation reference voltages outputted from the changeover circuit, generating an analog video signal by selecting any one of the gradation voltages based on an externally supplied digital video signal, and thereafter outputting the analog video signal to the video signal lines.

In a second aspect of the present invention, based on the first aspect of the invention, further comprised is a display control circuit for supplying a timing control signal to the scanning signal line drive circuit, supplying a timing control signal and a digital video signal to the video signal line drive circuit, and holding gradation voltage data being set, and the second reference voltage generation circuit subjects the gradation voltage data outputted from the display control circuit to D/A conversion, thereby generating the second gradation reference voltages.

In a third aspect of the present invention, based on the second aspect of the invention, further comprised is a power supply voltage generation circuit for generating a power supply voltage for the video signal line drive circuit and outputting a suspension release signal for releasing operational suspension of the display control circuit after the generation of the power supply voltage, and the display control circuit, when supplied with the suspension release signal, outputs the gradation voltage data being held to the second reference voltage generation circuit.

In a fourth aspect of the present invention, based on the first aspect of the invention, further comprised is a power supply voltage generation circuit for generating a power supply voltage for the video signal line drive circuit, and the first reference voltage generation circuit includes a plurality of nodes formed by connecting a plurality of resistances in a series, and generates the first gradation reference voltages at two or more of the nodes by performing resistive division on a base gradation voltage supplied from the power supply voltage generation circuit.

In a fifth aspect of the present invention, based on the fourth aspect of the invention, resistance values for the resistances are averages of resistance values for resistances included in voltage dividing circuits used for driving a display portion of the same type as said display portion.

In a sixth aspect of the present invention, based on the fourth aspect of the invention, resistance values for the resistances are the same as those for resistances included in an existing display device.

In a seventh aspect of the present invention, based on the first aspect of the invention, further comprised is a common electrode drive circuit for outputting a common voltage, the display portion includes a plurality of pixel electrodes provided in the display elements and a common electrode provided in common to the pixel electrodes, the common electrode drive circuit supplies the common voltage to the common electrode, the first gradation reference voltages include first alternating-current gradation reference voltages being gradation reference voltages higher than the common voltage, and second alternating-current gradation reference voltages being gradation reference voltages lower than the common voltage, the second gradation reference voltages include third alternating-current gradation reference voltages being gradation reference voltages higher than the common voltage, and fourth alternating-current gradation reference voltages being gradation reference voltages lower than the common voltage, the gradation voltages include first alternating-current gradation voltages being gradation voltages higher than the common voltage, and second alternating-current gradation voltages being gradation voltages lower than the common voltage, the first alternating-current gradation voltages being generated based on either the first or third alternating-current gradation reference voltages, the second alternating-current gradation voltages being generated based on either the second or fourth alternating-current gradation reference voltages, and the display elements are driven via alternating-current drive by the pixel electrodes and the common electrode, the pixel electrodes having applied thereto either a first or second alternating-current analog video signal generated based on the first or second alternating-current gradation voltages, the common electrode having the common voltage applied thereto.

In an eighth aspect of the present invention, based on the first aspect of the invention, at least the first reference voltage generation circuit, the second reference voltage generation circuit, and the changeover circuit are formed in a single semiconductor chip.

A ninth aspect of the present invention is directed to a method for driving an active-matrix display device for providing a gradation display of video to be displayed, the display device being provided with a display portion including a plurality of scanning signal lines, a plurality of video signal lines crossing the scanning signal lines, and a plurality of display elements arranged in a matrix in accordance with intersections between the scanning signal lines and the video signal lines, the method comprising:

a first reference voltage generation step of generating first gradation reference voltages immediately after the display device is powered on, the first gradation reference voltages each having a fixed voltage value;

a second reference voltage generation step of generating second gradation reference voltages later than the first gradation reference voltages, the second gradation reference voltages each having a variable voltage value;

a changeover step of, after the generation of the second gradation reference voltages, changing over the first gradation reference voltages to the second gradation reference voltages, and outputting the second gradation reference voltages;

a gradation voltage generation step of generating gradation voltages based on either the first or second gradation reference voltages being outputted;

a video signal output step of generating an analog video signal by selecting any one of the gradation voltages based on an externally supplied digital video signal, and outputting the analog video signal to the video signal lines; and a scanning signal line activation step of selectively activating the scanning signal lines.

In a tenth aspect of the present invention, based on the ninth aspect of the invention, further comprised is a gradation voltage data output step of outputting gradation voltage data being set from a predetermined register, and in the second reference voltage generation step, the outputted gradation voltage data is subjected to D/A conversion.

In an eleventh aspect of the present invention, based on the tenth aspect of the invention, further comprised is a suspension release signal output step of, after generation of a power supply voltage required for generating the analog video signal, outputting a suspension release signal for allowing the gradation voltage data to be outputted, and in the gradation voltage data output step, the gradation voltage data is outputted after the suspension release signal is outputted.

In a twelfth aspect of the present invention, based on the ninth aspect of the invention, further comprised is a common voltage output step of outputting a common voltage to a common electrode provided in common to the display elements, in the first reference voltage generation step, first and second alternating-current gradation reference voltages are generated, the first alternating-current gradation reference voltages being gradation reference voltages higher than the common voltage, the second alternating-current gradation reference voltages being gradation reference voltages lower than the common voltage, in the second reference voltage generation step, third and fourth alternating-current gradation reference voltages are generated, the third alternating-current gradation reference voltages being gradation reference voltages higher than the common voltage, the fourth alternating-current gradation reference voltages being gradation reference voltages lower than the common voltage, in the gradation voltage generation step, first alternating-current gradation voltages being gradation voltages higher than the common voltage are generated based on the first or third alternating-current gradation reference voltages, and second alternating-current gradation voltages being gradation voltages lower than the common voltage are generated based on the third or fourth alternating-current gradation reference voltages, and in the video signal output step, either a first or second alternating-current analog video signal generated based on the first or second alternating-current gradation voltages is outputted to the video signal lines, thereby driving the display elements via alternating-current drive together with the common voltage.

Effect of the Invention

According to the first aspect of the present invention, the display device has a first reference voltage generation circuit and a second reference voltage generation circuit. The second reference voltage generation circuit generates second gradation reference voltages each having a variable voltage value, and therefore even when the display portion is renewed, resulting in changed gamma characteristics, it is possible to generate second gradation reference voltages with voltage values suited to post-renewal gamma characteristics in a simplified and expeditious manner. In addition, when it takes some time to generate second gradation reference voltages after the display device is powered on, the first reference voltage generation circuit is caused to output first gradation reference voltages with fixed voltage values during that time, thereby generating first gradation voltages temporarily used at the time of activation of the display device. Then, when second gradation reference voltages are generated, the first gradation reference voltages are changed over to the second gradation reference voltages, thereby generating second gradation voltages. In this manner, even when it takes some time to generate the second gradation reference voltages, the first gradation reference voltages are changed over to the second gradation reference voltages after the generation of the second gradation reference voltages, so that, even when the display portion is renewed, it is possible to perform gamma correction tailored to the renewed display portion in a simplified and expeditious manner, thereby improving the efficiency of production of the display device.

According to the second aspect of the present invention, the second reference voltage generation circuit receives gradation voltage data held in the display control circuit, and subjects the received gradation voltage data to D/A conversion, thereby generating second gradation reference voltages. Therefore, even when the display portion is renewed, the second reference voltage generation circuit is simply required to rewrite the gradation voltage data to generate second gradation reference voltages suited to gamma characteristics of the renewed display portion.

According to the third aspect of the present invention, the display control circuit is suspended until it receives a suspension release signal to release its operational suspension from the power supply voltage generation circuit, and therefore the gradation voltage data cannot be outputted to the second reference voltage generation circuit. Accordingly, the second gradation reference voltages generated by subjecting gradation voltage data to D/A conversion are outputted later than the first gradation reference voltages generated immediately after the display device is powered on. Therefore, the first gradation reference voltages are temporarily used until the second gradation reference voltages are generated.

According to the fourth aspect of the present invention, the first reference voltage generation circuit includes a voltage dividing circuit having a plurality of resistances connected in a series. The voltage dividing circuit has applied thereto a base gradation voltage generated in the power supply voltage generation circuit immediately after the display device is powered on, so that first gradation reference voltages are generated via resistive division. Thus, the first reference voltage generation circuit can generate the first gradation reference voltages immediately after the display device is powered on.

According to the fifth aspect of the present invention, resistance values for the resistances are averages of resistance values for resistances included in a display device used for driving a display portion of the same type as the aforementioned display portion. Also, according to the sixth aspect of the present invention, resistance values for the resistances are the same as those for resistances included in a display portion of an existing display device. Therefore, the first gradation voltages generated based on the first gradation reference voltages are not optimal gradation voltages for gamma characteristics of the renewed display portion. However, they are gradation voltages generally used for similar display portions, and therefore they can be provisionally used for generating first analog video signals until optimal second gradation reference voltages for the renewed display portion are generated.

According to the seventh aspect of the present invention, first alternating-current gradation voltages higher than the voltage at the common electrode are generated based on first or third alternating-current gradation reference voltages higher than the voltage at the common electrode, and second alternating-current gradation voltages lower than the voltage at the common electrode are generated based on second or fourth alternating-current gradation reference voltages lower than the voltage at the common electrode. Then, either one of the first and second alternating-current analog video signals generated based on the first and second alternating-current gradation voltages, respectively, are applied to the pixel electrodes, and the common voltage is applied to the common electrode, so that the display device can be driven via alternating-current drive.

According to the eighth aspect of the present invention, at least the first reference voltage generation circuit, the second reference voltage generation circuit, and the changeover circuit are formed in a single semiconductor chip, and therefore the display device can be reduced in size, resulting in reduction in production cost.

DESCRIPTION OF THE REFERENCE CHARACTERS

Figure 1:
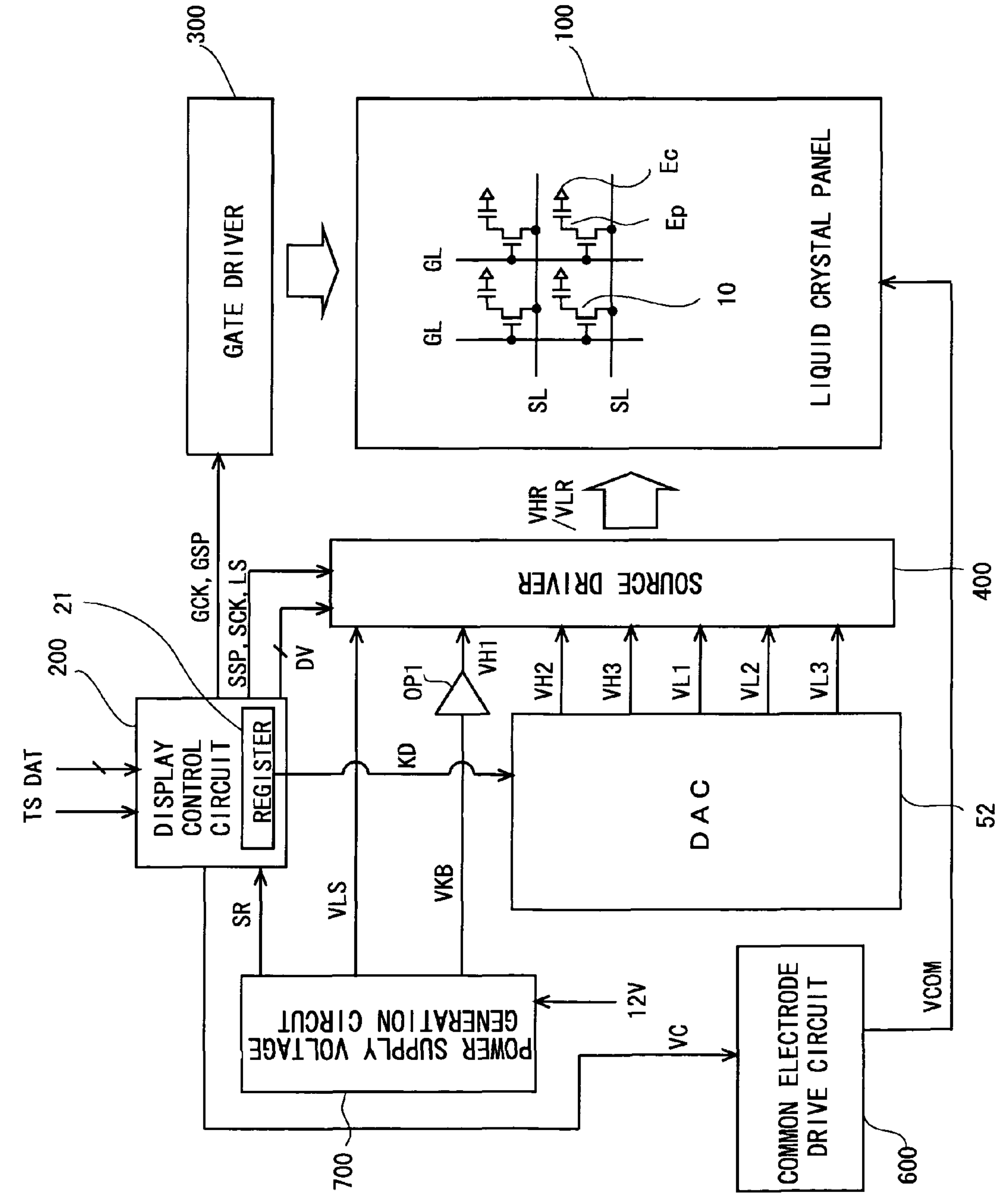
FIG. 1 is a block diagram illustrating the overall configuration of a liquid crystal display device for a basic study.

15 control board
44 gradation voltage generation circuit
44*a* first voltage dividing circuit
44*b* second voltage dividing circuit
45 selector
45*a* VH-side selector
45*b* VL-side selector
48*a* to 48*g* analog switch
51 voltage dividing circuit
52 D/A converter
100 liquid crystal panel
200 display control circuit
250 changeover circuit
300 gate driver (scanning signal line drive circuit)
400 source driver (video signal line drive circuit)
500 reference voltage generation circuit
600 common electrode drive circuit
700 power supply voltage generation circuit
Ec common electrode
Ep pixel electrode
GL gate bus line (scanning signal line)
KD gradation voltage data
R1 to R6 resistance
SL source bus line (video signal line)
SR suspension release signal
VCOM common voltage
VKB base gradation voltage
VH1 to VH3 first to third VH-side gradation reference voltages
VL1 to VL3 first to third VL-side gradation reference voltages
VHt1 to VHt3 first to third VH-side tentative gradation reference voltages
VLt1 to VLt3 first to third VL-side tentative gradation reference voltages
VHn1 to VHn3 first to third VH-side normal gradation reference voltages
VLn1 to VLn3 first to third VL-side normal gradation reference voltages
VHRt, VLRt VH-side tentative gradation voltage group, VL-side tentative gradation voltage group
VHRn, VLRn VH-side normal gradation voltage group, VL-side normal gradation voltage group

BEST MODE FOR CARRYING OUT THE INVENTION

<1. Basic Study>

In development of a liquid crystal display device according to an embodiment of the present invention, a basic study was conducted in order to clarify issues and solutions therein. Accordingly, a liquid crystal display device used in the basic study will be described first with reference to the accompanying drawings.

<1.1 Overall Configuration and Operation>

FIG. 1 is a block diagram illustrating the overall configuration of the liquid crystal display device used for the basic study. As shown in FIG. 1, the liquid crystal display device includes a liquid crystal panel 100 having a plurality of pixel formation portions arranged in a matrix, a display control circuit 200, a gate driver (scanning signal line drive circuit) 300, a source driver (video signal line drive circuit) 400, a D/A converter (DAC) 52 acting as a reference voltage generation circuit, a common electrode drive circuit 600, and a power supply voltage generation circuit 700, so that a 256-tone gradation display can be provided.

In the liquid crystal panel 100, a plurality of source bus lines (video signal lines) SL and a plurality of gate bus lines (scanning signal lines) GL are arranged in a matrix, and pixel formation portions (display elements) are provided in the vicinity of intersections between the source bus lines SL and the gate bus lines GL. Each pixel formation portion includes a TFT 10, which acts as a switching element and has a gate electrode connected to the gate bus line GL passing through a corresponding intersection, and a source electrode connected to the source bus line SL passing through the intersection, a pixel electrode Ep connected to a drain electrode of the TFT 10, and a common electrode Ec provided in common to the pixel formation portions, the pixel electrode Ep and the common electrode Ec forming a pixel capacitance.

The display control circuit 200 receives image data DAT and a timing control signal TS, which are externally transmitted, and outputs a digital video signal DV, a source start pulse signal SSP, a source clock signal SCK, and a latch strobe signal LS to the source driver 400. Also, the display control circuit 200 outputs a gate start pulse signal GSP and a gate clock signal GCK to the gate driver 300, and a common electrode control signal VC to the common electrode drive circuit 600.

The source driver 400 receives the digital video signal DV, the source start pulse signal SSP, the source clock signal SCK, and the latch strobe signal LS outputted from the display control circuit 200, and applies a drive video signal to the source bus lines SL in order to charge each pixel capacitance in the liquid crystal panel 100. To sequentially select each gate bus line GL for one horizontal scanning period, the gate driver 300 sequentially applies an active scanning signal to each gate bus line GL based on the gate start pulse signal GSP and the gate clock signal GCK outputted from the display control circuit 200. In this manner, each source bus line SL has the drive video signal applied thereto, and each gate bus line GL has the scanning signal applied thereto, so that the liquid crystal panel 100 displays an image.

The power supply voltage generation circuit 700, when having a reference voltage of 12 volts externally applied thereto, generates and outputs a power supply voltage for each circuit via an internal DC/DC converter. Note that FIG. 1 shows only an analog power supply voltage VLS and a base gradation voltage VKB, which are necessary for explanation of the embodiment of the present invention, from among all power supply voltages to be generated, with the remaining other power supply voltages being omitted.

<1.2 Generation of Gradation Reference Voltages and Gradation Voltages>

Described next is generation of gradation reference voltages to be supplied to the source driver 400. In the liquid crystal display device, there are three gradation reference voltages, which are first to third gradation reference voltages VH1 to VH3 (hereinafter, referred to as "VH-side gradation reference voltages"), required for generating gradation voltages higher than a common electrode VCOM (hereinafter, referred to as "VH-side gradation voltages"), and another three gradation reference voltages, which are first to third gradation reference voltages VL1 to VL3 (hereinafter, ref erred to as "VL-side gradation reference voltages"), required for generating gradation voltages lower than the common electrode VCOM (hereinafter, referred to as "VL-side gradation voltages").

These six gradation reference voltages VH1 to VH3 and VL1 to VL3 are generated as follows. Concretely, the first VH-side gradation reference voltage VH1 is a base gradation voltage VKB of 15.2V generated in the power supply voltage generation circuit 700 and then inputted to the source driver 400 via an operational amplifier OP1. Also, data required for generating the gradation reference voltages (hereinafter, referred to as "gradation voltage data") KD is prestored in a register 21 provided in the display control circuit 200. The gradation voltage data KD is rewritable in accordance with voltage values for the gradation reference voltages VH1 to VH3 and VL1 to VL3 desired to be generated. In addition, the data is outputted to the D/A converter (DAC) 52 when the display control circuit 200 starts operating.

The D/A converter 52 subjects the received gradation voltage data KD to D/A conversion, thereby generating the second and third VH-side gradation reference voltages VH2 and VH3 and the first to third VL-side gradation reference voltages VL1 to VL3, which are outputted to the source driver 400.

The six gradation reference voltages VH1 to VH3 and VL1 to VL3 inputted to the source driver 400 are supplied to a gradation voltage generation circuit provided in the source driver 400. As will be described later, the gradation voltage generation circuit includes a first voltage dividing circuit for generating a VH-side gradation voltage group and a second voltage dividing circuit for generating a VL-side gradation voltage group, each of the circuits having 256 resistances connected in a series. The first voltage dividing circuit generates a VH-side 256-tone gradation voltage group VHR based on the first to third VH-side gradation reference voltages VH1 to VH3, and the second voltage dividing circuit generates a VL-side 256-tone gradation voltage group VLR based on the first to third VL-side gradation reference voltages VL1 to VL3.

In the liquid crystal display device, even when the liquid crystal panel 100 is replaced in order to renew the liquid crystal panel 100 or change the size of the panel, it is simply necessary to write gradation voltage data KD to the register 21 in the display control circuit 200 in accordance with gamma characteristics of a new liquid crystal panel 100, and there is no need to prepare a new control board. Therefore, even when the liquid crystal panel 100 is replaced, the control board that has been used until then can be used without modification, so that cost and time required for recreating a control board can be saved. Thus, it is possible to improve the efficiency of production of the liquid crystal display device.

<1.3 Issues>

Figure 2:
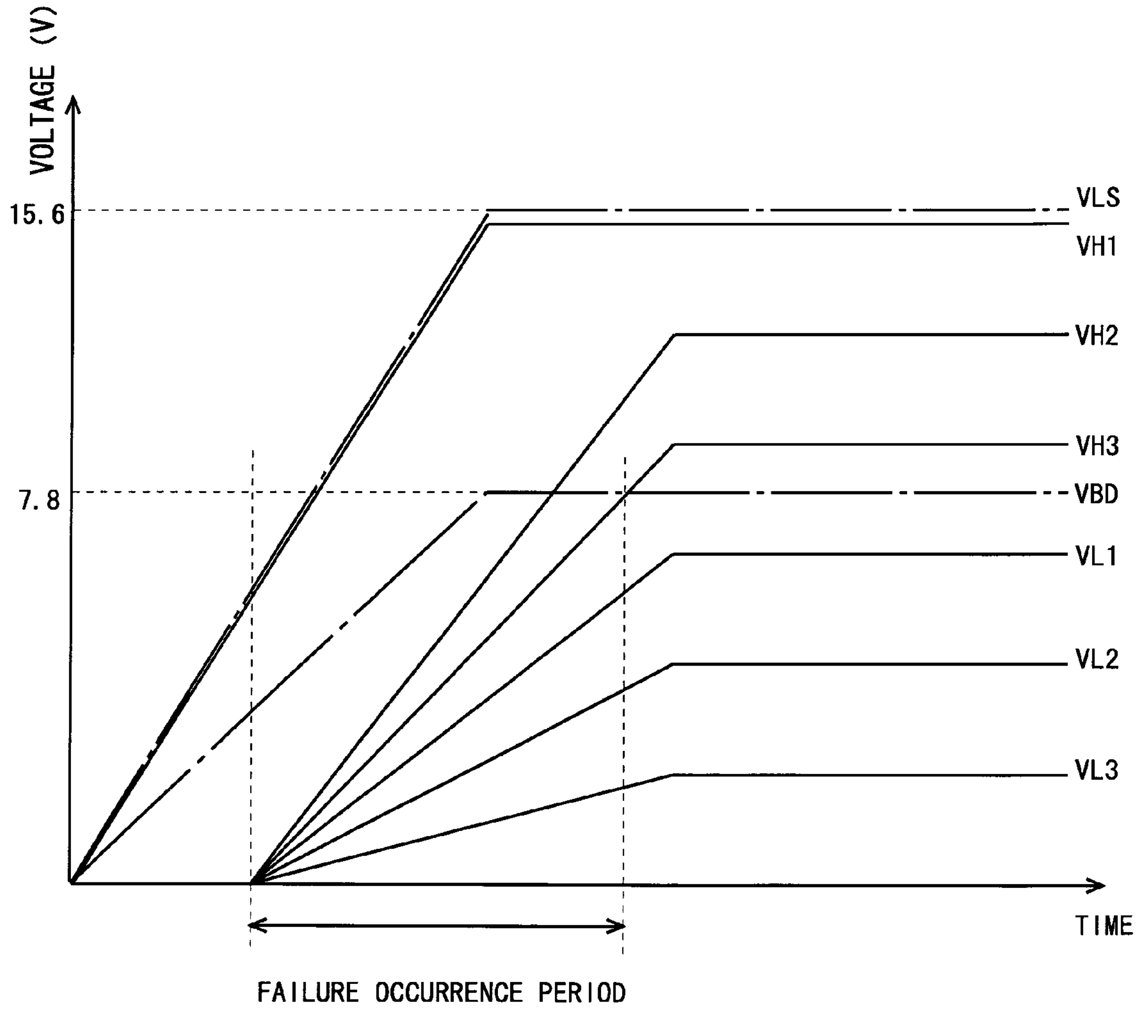
FIG. 2 is a graph illustrating over-time changes of gradation reference voltages in the basic study.

FIG. 2 is a graph illustrating over-time changes of gradation reference voltages for the liquid crystal display device used in the basic study. Referring to FIG. 2, their relationship will be described in detail. The first VH-side gradation reference voltage VH1 is a base gradation voltage VKB generated in the power supply voltage generation circuit 700, and therefore rises earlier than the other gradation reference voltages, reaching 15.2V. After a lapse of a predetermined period of time since the rise of the first VH-side gradation reference voltage VH1, the second and third VH-side gradation reference voltages VH2 and VH3 and the first to third VL-side gradation reference voltages VL1 to VL3 simultaneously rise to their respective predetermined voltage values. Note that during a period between the rise of the first VH-side gradation reference voltage VH1 and the rise of the second VH-side gradation reference voltage VH2 to the third VL-side gradation reference voltage VL3, terminals for the second VH-side gradation reference voltage VH2 to the third VL-side gradation reference voltage VL3 are all kept open, and these voltages are temporarily rendered at the ground potential GND before starting to rise.

Also, in FIG. 2, the analog power supply voltage VLS and the withstand reference voltage VBD are indicated by one-dot chain lines. The analog power supply voltage VLS and the withstand reference voltage VBD starts to rise from the ground voltage GND simultaneously with the first VH-side gradation reference voltage VH1, and reach 15.6V and 7.8V, respectively, when the first VH-side gradation reference voltage VH1 reaches 15.2V.

The reason why the first VH-side gradation reference voltage VH1 rises at a different time from the other gradation reference voltages VH2 to VL3 as described above will be explained. The power supply voltage generation circuit 700, when externally supplied with a reference voltage, generates various power supply voltages based on the reference voltage via the DC/DC converter. A base gradation voltage VKB generated by a regulator based on the analog power supply voltage VLS, which is one of the power supply voltages, is used as the first VH-side gradation reference voltage VH1. Accordingly, the first VH-side gradation reference voltage VH1 rises simultaneously with the analog power supply voltage VLS.

As opposed to this, when the first VH-side gradation reference voltage VH1 rises, the power supply voltage generation circuit 700 has not yet outputted a suspension release signal SR to the display control circuit 200, and therefore the display control circuit 200 has its operation suspended. Thereafter, the power supply voltage generation circuit 700 outputs the suspension release signal SR to the display control circuit 200 upon completion of generating the required power supply voltages. Upon reception of the suspension release signal SR, the display control circuit 200 is released from the operational suspension, and outputs the gradation voltage data KD stored in the register 21 to the D/A converter 52. The D/A converter 52 subjects the supplied gradation voltage data KD to D/A conversion, thereby generating the second VH-side gradation reference voltage VH2 to the third VL-side gradation reference voltage VL3. Accordingly, the first VH-side gradation reference voltage VH1 is generated at a different time from the other gradation reference voltages VH2 to VL3.

Next, a study is made on whether or not the first to third VH-side gradation reference voltages VH1 to VH3 and the first to third VL-side gradation reference voltages VL1 to VL3 satisfy equation (1). Accordingly, equation (1) is reproduced below.

$$VLS > VH1 \text{ to } VH3 > VBD > VL1 \text{ to } VL3 > GND \quad (1)$$

As can be appreciated from FIG. 2, the first to third VL-side gradation reference voltages VL1 to VL3 always fall between the ground voltage GND and the withstand reference voltage VBD, and the first VH-side gradation reference voltage VH1 always falls between the analog power supply voltage VLS and the withstand reference voltage VBD, so that they both always satisfy equation (1).

On the other hand, the second and third VH-side gradation reference voltages VH2 and VH3 fall between the ground voltage GND and the withstand reference voltage VBD until a predetermined period of time passes after the rise from the ground voltage GND, so that equation (1) is not satisfied. However, after a further lapse of time, the second gradation reference voltage VH2 becomes higher than the withstand reference voltage VBD first, and then the third gradation reference voltage VH3 also becomes higher than the withstand reference voltage VBD. Therefore, the second and third VH-side gradation reference voltages VH2 and VH3 ultimately satisfy equation (1) as well.

When either the second or third VH-side gradation reference voltage VH2 or VH3 does not satisfy equation (1), excess current flows between the terminal for the first VH-side gradation reference voltage VH1 and the terminal for the second or third VH-side gradation reference voltage VH2 or VH3, specifically, through a selector (also referred to as a "D/A converter") in the source driver 400, as will be described in detail later. As a result, the selector fails to operate normally, so that no video is displayed on the liquid crystal panel 100.

Note that the first VH-side gradation reference voltage VH1 is a base gradation voltage VKB generated from the analog power supply voltage VLS, and therefore excess current flows between the terminal for the analog power supply voltage VLS and the terminal for the second or third VH-side gradation reference voltage VH2 or VH3. Because the voltages at these terminals, which are open particularly at the time of the rise of the second or third VH-side gradation reference voltage VH2 or VH3, rise after temporarily being rendered at the ground voltage GND, excess current flows between the terminal for the analog power supply voltage VLS and the ground terminal. The mechanism in which excess current flows through the selector will be described in detail later.

<2. Embodiment>

Hereinafter, an embodiment of the present invention will be described with reference to the accompanying drawings.

<2.1 Overall Configuration>

Figure 3:
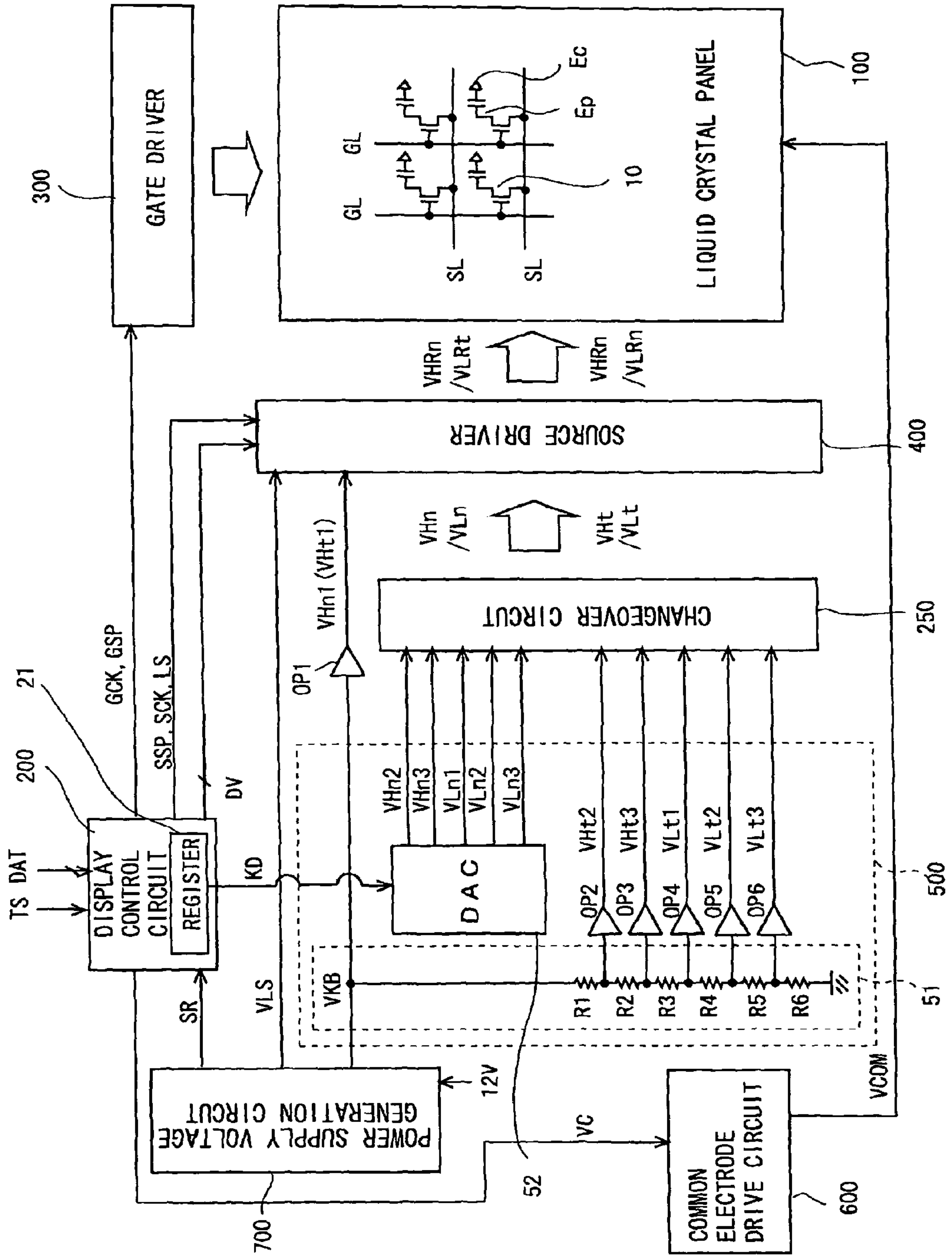
FIG. 3 is a block diagram illustrating the overall configuration of an active-matrix liquid crystal display device according to an embodiment of the present invention.

FIG. 3 is a block diagram illustrating the overall configuration of an active-matrix liquid crystal display device according to an embodiment of the present invention. The liquid crystal display device includes a liquid crystal panel 100, a display control circuit 200, a changeover circuit 250, a gate driver 300, a source driver 400, a reference voltage generation circuit 500, a common electrode drive circuit 600, and a power supply voltage generation circuit 700, so that a 256-tone gradation display can be provided. For the circuits mentioned above, the same circuits as those in the liquid crystal display device used in the basic study are denoted by the same reference characters, and any descriptions thereof will be omitted except for differences.

<2.2 Reference Voltage Generation Circuit>

The reference voltage generation circuit 500 in the present embodiment includes a voltage dividing circuit 51 having six resistances R1 to R6 connected in a series, and a D/C converter (DAC) 52. The voltage dividing circuit 51 generates six gradation reference voltages VH1 to VH3 and VL1 to VL3, and the D/C converter 52 generates five gradation reference voltages VH2 to VH3 and VL1 to VL3. In the following description, the gradation reference voltages generated by the voltage dividing circuit 51 are referred to as "tentative gradation reference voltages", and the gradation reference voltages generated by the D/C converter 52 are referred to as "normal gradation reference voltages".

Described first is the case where first VH-side tentative gradation reference voltage VHt1 to third VL-side tentative gradation reference voltage VLt3 are generated by the voltage dividing circuit 51. The voltage dividing circuit 51 has supplied at one terminal a base gradation voltage VKB of 15.2V from the power supply voltage generation circuit 700, and is grounded at the other terminal. Also, the voltage dividing circuit 51 has extraction lines extending from nodes for the resistances R1 to R6 to extract voltages obtained through division. Therefore, the voltage dividing circuit 51 is capable of, when supplied with the base gradation voltage VKB, immediately generating the first VH-side tentative gradation reference voltage VHt1 to the third VL-side tentative gradation reference voltage VLt3.

As for the first VH-side tentative gradation reference voltage VHt1 to the third VL-side tentative gradation reference voltage VLt3, the first to third VH-side tentative gradation reference voltages VHt1 to VHt3 are required for generating a tentative gradation voltage group VHRt higher than a common voltage VCOM at the common electrode Ec, and the first to third VL-side tentative gradation reference voltages VLt1 to VLt3 are required for generating a tentative gradation voltage group VLRt lower than the common voltage VCOM.

The first VH-side tentative gradation reference voltage VHt1 is a voltage at an upper terminal of the resistance R1 in the voltage dividing circuit 51, and is directly inputted to the source driver 400 via the operational amplifier OP1. The first VH-side tentative gradation reference voltage VHt1 is a voltage of 15.2V, which is equal to the base gradation voltage VKB outputted from the power supply voltage generation circuit 700 and also equal to a first normal gradation reference voltage VHn1 to be described later. Accordingly, in FIG. 3, the first VH-side tentative gradation reference voltage VHt1 is indicated in parentheses.

Also, the second and third VH-side tentative gradation reference voltages VHt2 and VHt3 are voltages extracted from upper nodes for the resistances R2 and R3, respectively, in the voltage dividing circuit 51, the first to third VL-side tentative gradation reference voltages VLt1 to VLt3 are voltages extracted from upper nodes for the resistances R4, R5, and R6, respectively, in the voltage dividing circuit 51, and the voltages are outputted to the changeover circuit 250 via the operational amplifiers OP2 to OP6, respectively. Here, the operational amplifiers OP1 to OP6 are intended to convert voltages inputted from the nodes for the resistances R1 to R6 into low-impedance output voltages and output them.

Note that resistance values for the resistances R1 to R6 are the same as those for resistances included in voltage dividing circuits for use in driving mass-produced liquid crystal panels (previous model), or averages for resistance values for resistances included in voltage dividing circuits for use in driving liquid crystal panels of the same type as the liquid crystal panel 100 being used.

While the voltage dividing circuit 51 has been described as having three resistances each for generating the first VH-side tentative gradation reference voltages VHt1 to VHt3 and for generating the first VL-side tentative gradation reference voltages VLt1 to VLt3, the number of resistances may be increased/decreased in accordance with the number of tentative gradation reference voltages.

Described next is the case where the normal gradation reference voltages are generated by the D/C converter 52. Data required for generating the normal gradation reference voltages is prestored as gradation setting data KD in the register 21 provided in the display control circuit 200. When the liquid crystal display device is powered on, and the display control circuit 200 starts operating, the display control circuit 200 outputs the gradation setting data KD stored in the register 21 to the D/A converter 52. The D/A converter 52 subjects the received gradation setting data KD to D/A conversion, thereby generating second and third VH-side normal gradation reference voltages VHn2 and VHn3, and first to third VL-side normal gradation reference voltages VLn1 to VLn3, which are outputted to the changeover circuit 250. Note that the gradation setting data KD does not have to be prestored in the register, and can be stored as necessary.

The changeover circuit 250 has initially inputted thereto only the second VH-side tentative gradation reference voltage VHt2 to the third VL-side tentative gradation reference voltage VLt3 from the voltage dividing circuit 51, and therefore the changeover circuit 250 outputs to the source driver 400 the second VH-side tentative gradation reference voltage VHt2 to the third VL-side tentative gradation reference voltage VLt3. Then, when the D/C converter 52 generates the second VH-side normal gradation reference voltage VHn2 to the third VL-side normal gradation reference voltage VLn3, the generated second VH-side normal gradation reference voltage VHn2 to third VL-side normal gradation reference voltage VLn3 are inputted to the changeover circuit 250. Therefore, the changeover circuit 250 outputs to the source driver 400 the second VH-side normal gradation reference voltage VHn2 to the third VL-side normal gradation reference voltage VLn3 in place of the second VH-side tentative gradation reference voltage VHt2 to the third VL-side tentative gradation reference voltage VLt3.

<2.3 Operation of the Power Supply Voltage Generation Circuit>

When a reference voltage of 12V is supplied externally, the power supply voltage generation circuit 700 generates and outputs power supply voltages required for circuit operations. Among the power supply voltages generated by the power supply voltage generation circuit 700, a base gradation voltage VKB of 15.2V generated in the power supply voltage generation circuit 700 based on the analog power supply voltage VLS is used by the voltage dividing circuit 51 generating the first VH-side tentative gradation reference voltage VHt1 to the third VL-side tentative gradation reference voltage VLt3.

After completely generating the required power supply voltages, the power supply voltage generation circuit 700 outputs a suspension release signal SR to the display control circuit 200. Upon reception of the suspension release signal SR, the display control circuit 200 outputs the gradation setting data KD stored in the register 21 to the D/C converter 52. As a result, the D/C converter 52 subjects the received gradation voltage data KD to D/A conversion, thereby generating the second VH-side normal gradation reference voltage VHn2 to the third VL-side normal gradation reference voltage VLn3. Accordingly, there is a time lag between the generation of the first VH-side tentative gradation reference voltage VHt1 to the third VL-side tentative gradation reference voltage VLt3 and the generation of the first VH-side normal gradation reference voltage VHn1 to the third VL-side normal gradation reference voltage VLn3.

<2.4 Source Driver>

Figure 4:
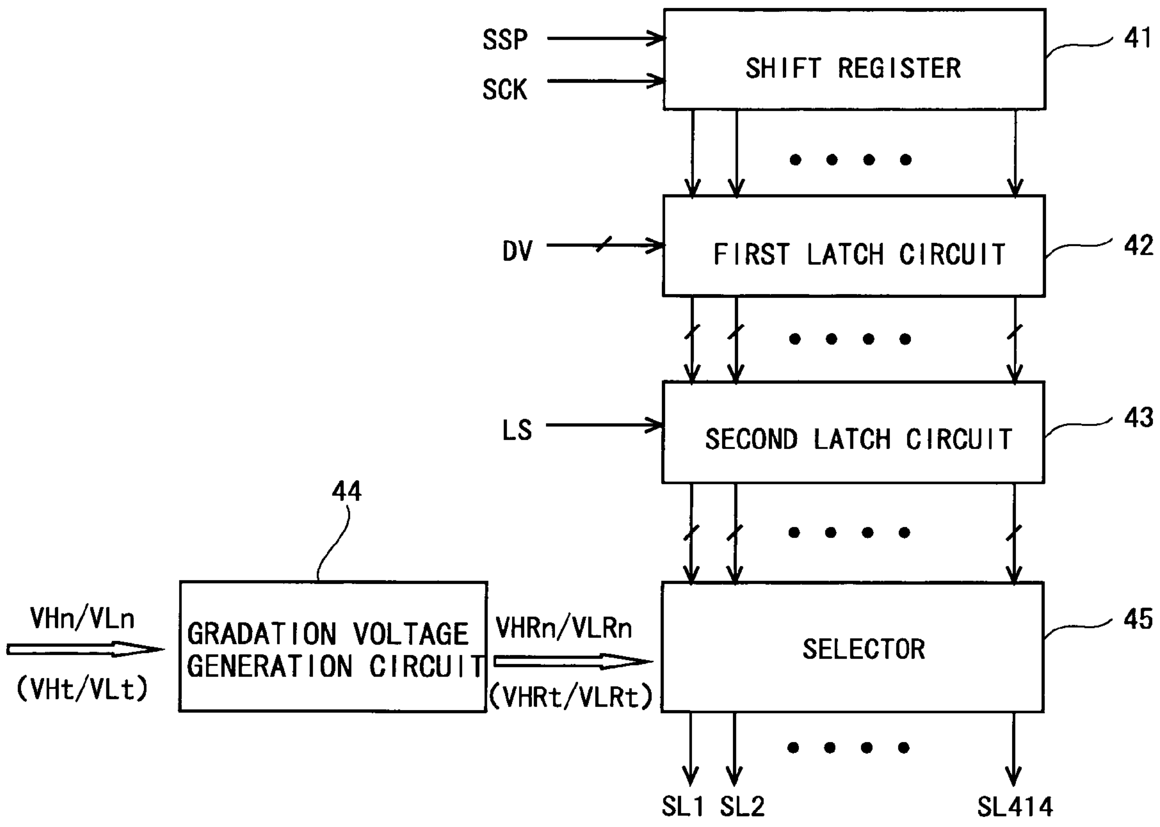
FIG. 4 is a block diagram illustrating the configuration of a source driver in the embodiment.

FIG. 4 is a block diagram illustrating the configuration of the source driver 400 in the present embodiment. The source driver 400 includes a shift register 41, a first latch circuit 42, a second latch circuit 43, a gradation voltage generation circuit 44, and a selector (also referred to as a "D/A converter") 45. In the following description, the source driver 400 will be described as a source driver capable of a 256-tone gradation display.

The shift register 41 has inputted thereto a source start pulse signal SSP and a source clock signal SCK outputted from the display control circuit 200. The shift register 41 sequentially transfers each pulse included in the source start pulse signal SSP from its input terminal to its output terminal, based on the signals SSP and SCK. The first latch circuit 42 samples and latches a digital video signal DV outputted from the display control circuit 200 in accordance with the pulse inputted from the shift register 41, and transfers the latched digital video signal DV to the second latch circuit 43. When the digital video signal DV for pixel formation portions corresponding to one horizontal line is stored to the second latch circuit 43, the display control circuit 200 supplies a latch strobe signal LS to the second latch circuit 43. Upon reception of the latch strobe signal LS, the second latch circuit 43 outputs the digital video signal DV to the selector 45 for one horizontal scanning period. During that time, the shift register 41 and the first latch circuit 42 sequentially store a digital video signal DV for the next horizontal line.

Based on the first VH-side tentative gradation reference voltage VHt1 to third VL-side tentative gradation reference voltage VLt3 inputted from the voltage dividing circuit 51 via the changeover circuit 250, the gradation voltage generation circuit 44 generates 256 VH-side tentative gradation voltages VHRt0 to VHRt255 and 256 VL-side tentative gradation voltages VLRt0 to VLRt255, both of which correspond to 256 gradation levels that can be represented by the 8-bit digital video signal DV outputted from the second latch circuit 43, and are outputted as a VH-side tentative gradation voltage group VHRt and a VL-side tentative gradation voltage group VLRt, respectively.

From among each of the VH-side tentative gradation voltage group VHRt and the VL-side tentative gradation voltage group VLRt generated by the gradation voltage generation circuit 44, the selector 45 selects one tentative gradation voltage VHRt(n) or VLRt(n) corresponding to the 8-bit digital video signal DV, and outputs it as a drive video signal to each source bus line SL.

Subsequently, when the D/C converter 52 starts operating, the first VH-side tentative gradation reference voltage VHt1 directly inputted from the power supply voltage generation circuit 700, i.e., the first VH-side normal gradation reference voltage VHn1, and the second VH-side normal gradation reference voltage VHn2 to the third VL-side normal gradation reference voltage VLn3, which are inputted from the D/C converter 52 and subjected to changeover by the changeover circuit 250, are outputted to the gradation voltage generation circuit 44. Based on the supplied first VH-side normal gradation reference voltage VHn1 to third VL-side normal gradation reference voltage VLn3, the gradation voltage generation circuit 44 generates 256 VH-side normal gradation voltages VHRn0 to VHRn255 and 256 VL-side normal gradation voltages VLRn0 to VLRn255, both of which correspond to 256 gradation levels that can be represented by the 8-bit digital video signal DV outputted from the second latch circuit 43, and are outputted as a VH-side normal gradation voltage group VHRn and a VL-side normal gradation voltage group VLRn, respectively.

From among each of the VH-side normal gradation voltage group VHRn and the VL-side normal gradation voltage group VLRn generated by the gradation voltage generation circuit 44, the selector 45 selects one normal gradation voltage VHRn(n) or VLRn(n) corresponding to the 8-bit digital video signal DV, and outputs it as a drive video signal to each source bus line SL.

<2.5 Over-Time Changes of Gradation Reference Voltages>

Figure 5:
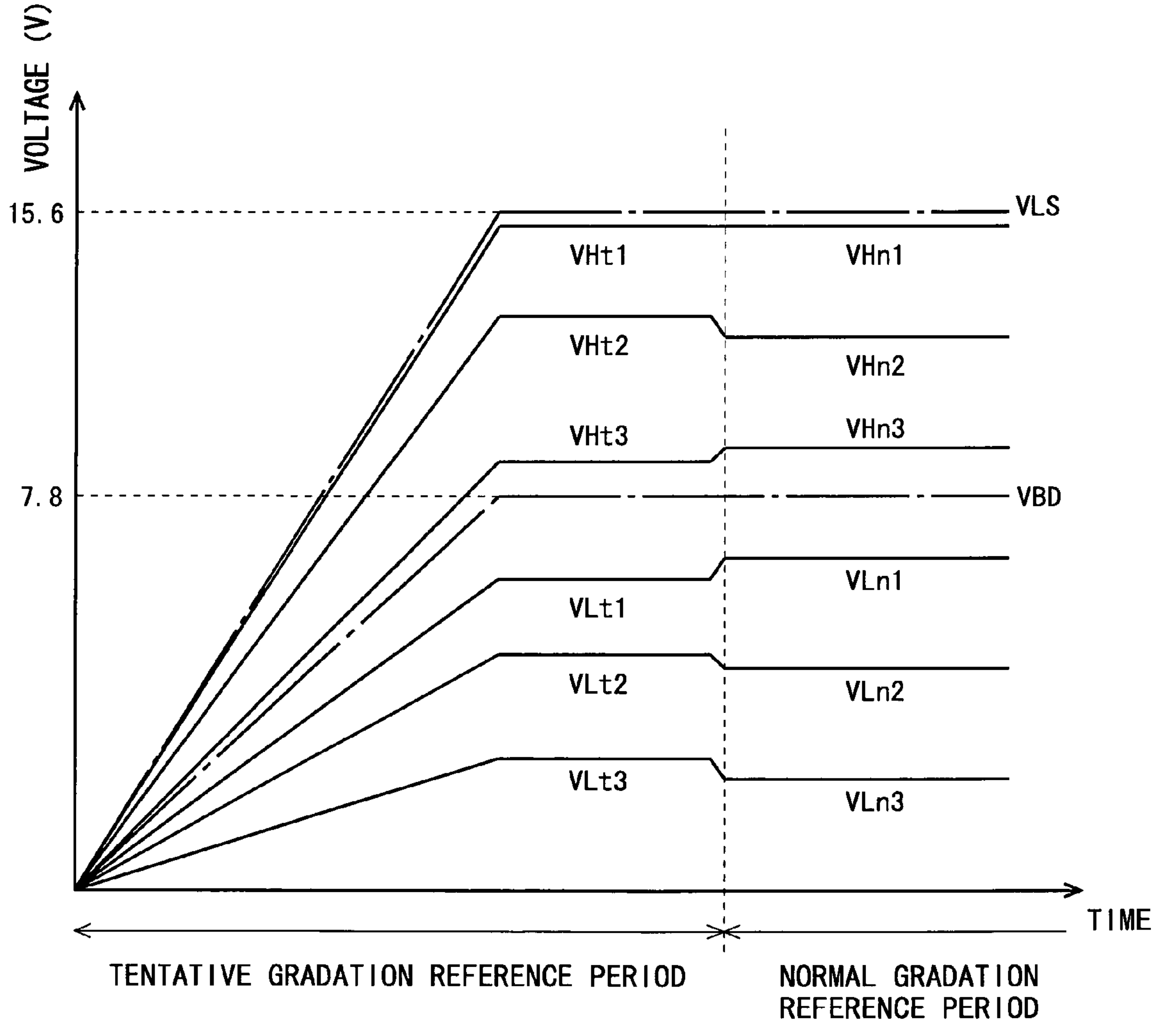
FIG. 5 is a graph illustrating over-time changes of VH- and VL-side gradation reference voltages generated by a reference voltage generation circuit in the embodiment.

FIG. 5 is a graph illustrating over-time changes of gradation reference voltages generated by the reference voltage generation circuit 500 in the present embodiment. As has already been described, the reference voltage generation circuit 500 in the present embodiment includes the voltage dividing circuit 51 and the D/A converter 52. Accordingly, there are shown in FIG. 5 the first VH-side tentative gradation reference voltage VHt1 to the third VL-side tentative gradation reference voltage VLt3 generated by the voltage dividing circuit 51, the second VH-side normal gradation reference voltage VHn2 to the third VL-side normal gradation reference voltage VLn3 generated by the D/A converter 52, and the first VH-side normal gradation reference voltage VHn1. Also, in FIG. 5, the analog power supply voltage VLS and the withstand reference voltage VBD are indicated by one-dot chain lines.

Simultaneously with the analog power supply voltage VLS and the withstand reference voltage VBD, the first VH-side tentative gradation reference voltage VHt1 to the third VL-side tentative gradation reference voltage VLt3 also rise from the ground voltage GND, and when the analog power supply voltage VLS and the withstand reference voltage VBD reach 15.6V and 7.8V, respectively, the first VH-side tentative gradation reference voltage VHt1 to the third VL-side tentative gradation reference voltage VLt3 also reach their predetermined voltages. The reason for this is that, when the base gradation voltage VKB is generated from the analog power supply voltage VLS, the generated base gradation voltage VKB is supplied to one terminal of the voltage dividing circuit 51, so that the first VH-side tentative gradation reference voltage VHt1 to the third VL-side tentative gradation reference voltage VLt3 rise from the ground voltage GND, and reach their predetermined voltages. At this stage, resistance values for the resistances R1 to R6 used in the voltage dividing circuit 51 correspond to resistance values for resistances used in a liquid crystal panel of a previous model or averages of resistance values for resistances used in liquid crystal panels of the same type as the liquid crystal panel 100, and therefore gamma characteristics of the renewed liquid crystal panel 100 are not taken into consideration. Accordingly, the generated second VH-side tentative gradation reference voltage VHt2 to third VL-side tentative gradation reference voltage VLt3 can be tentatively used for the renewed liquid crystal panel 100, but are not optimal. Therefore, analog video signals obtained through conversion based on the first VH-side tentative gradation reference voltage VHt1 to the third VL-side tentative gradation reference voltage VLt3 are also almost suited to the gamma characteristics of the liquid crystal panel 100, but are not as optimal signals as analog video signals generated based on the first VH-side normal gradation reference voltage VHn1 to the third VL-side normal gradation reference voltage VLn3. Thus, by using the first VH-side tentative gradation reference voltage VHt1 to the third VL-side tentative gradation reference voltage VLt3 tentatively generated in the voltage dividing circuit 51 for some period until analog video signals suited to the gamma characteristics of the liquid crystal panel 100 are outputted, it becomes possible to keep using a control board having mounted thereon a pre-renewal voltage dividing circuit 51 even after the liquid crystal panel 100 is renewed.

Then, when the second VH-side normal gradation reference voltage VHn2 to the third VL-side normal gradation reference voltage VLn3 are generated by the D/A converter 52, the generated second VH-side normal gradation reference voltage VHn2 to third VL-side normal gradation reference voltage VLn3 are inputted to the changeover circuit 250. As a result, the changeover circuit 250 changes the second VH-side tentative gradation reference voltage VHt2 to the third VL-side tentative gradation reference voltage VLt3 over to the second VH-side normal gradation reference voltage VHn2 to the third VL-side normal gradation reference voltage VLn3, and outputs to the source driver 400 the second VH-side normal gradation reference voltage VHn2 to the third VL-side normal gradation reference voltage VLn3. Also, the first VH-side normal gradation reference voltage VHn1 having the same voltage value as the first VH-side tentative gradation reference voltage VHt1 is directly inputted from the power supply voltage generation circuit 700 to the source driver 400. The first VH-side normal gradation reference voltages VHn1 to the third VL-side normal gradation reference voltage VLn3 thus obtained are suited to the gamma characteristics of the liquid crystal panel 100 being used. Until this point, the tentative gradation voltage groups VHRt and VLRt are generated in the source driver 400 based on the first VH-side tentative gradation reference voltage VHt1 to the third VL-side tentative gradation reference voltage VLt3, but after this, the normal gradation voltage groups VHRn and VLRn are generated based on the first VH-side normal gradation reference voltage VHn1 to the third VL-side normal gradation reference voltage VLn3.

<2.6 Relationship with Equation (1)>

Firstly, the three, i.e., first to third, VH-side tentative gradation reference voltages VHt1 to VHt3 always fall between the analog power supply voltage VLS and the withstand reference voltage VBD after rising from the ground voltage GND and before reaching their respective predetermined voltage values, and the three, i.e., first to third, VL-side tentative gradation reference voltages VLt1 to VLt3 also fall between the ground voltage GND and the withstand reference voltage VBD. Therefore, the first VH-side tentative gradation reference voltage VHt1 to the third VL-side tentative gradation reference voltage VLt3 generated in the voltage dividing circuit 51 always satisfy equation (1).

Secondly, all the three, i.e., first to third, VH-side normal gradation reference voltages VHn1 to VHn3 fall between the analog power supply voltage VLS and the withstand reference voltage VBD, and all the three, i.e., first to third, VL-side normal gradation reference voltages VLn1 to VLn3 fall between the withstand reference voltage VBD and the ground voltage GND. Therefore, the first to third VH-side normal gradation reference voltages VHn1 to VLn3 generated in the D/A converter 52 always satisfy equation (1) as well.

Accordingly, no excess current flows between the terminal for the analog power supply voltage VLS and the terminal for the second VH-side tentative gradation reference voltage VHt2 or the second normal gradation reference voltage VHn2, or between the terminal for the analog power supply voltage VLS and the terminal for the third VH-side tentative gradation reference voltage VHt3 or the third normal gradation reference voltage VHn3.

<2.7 Operations of the Gradation Voltage Generation Circuit and The Selector>

Figure 6:
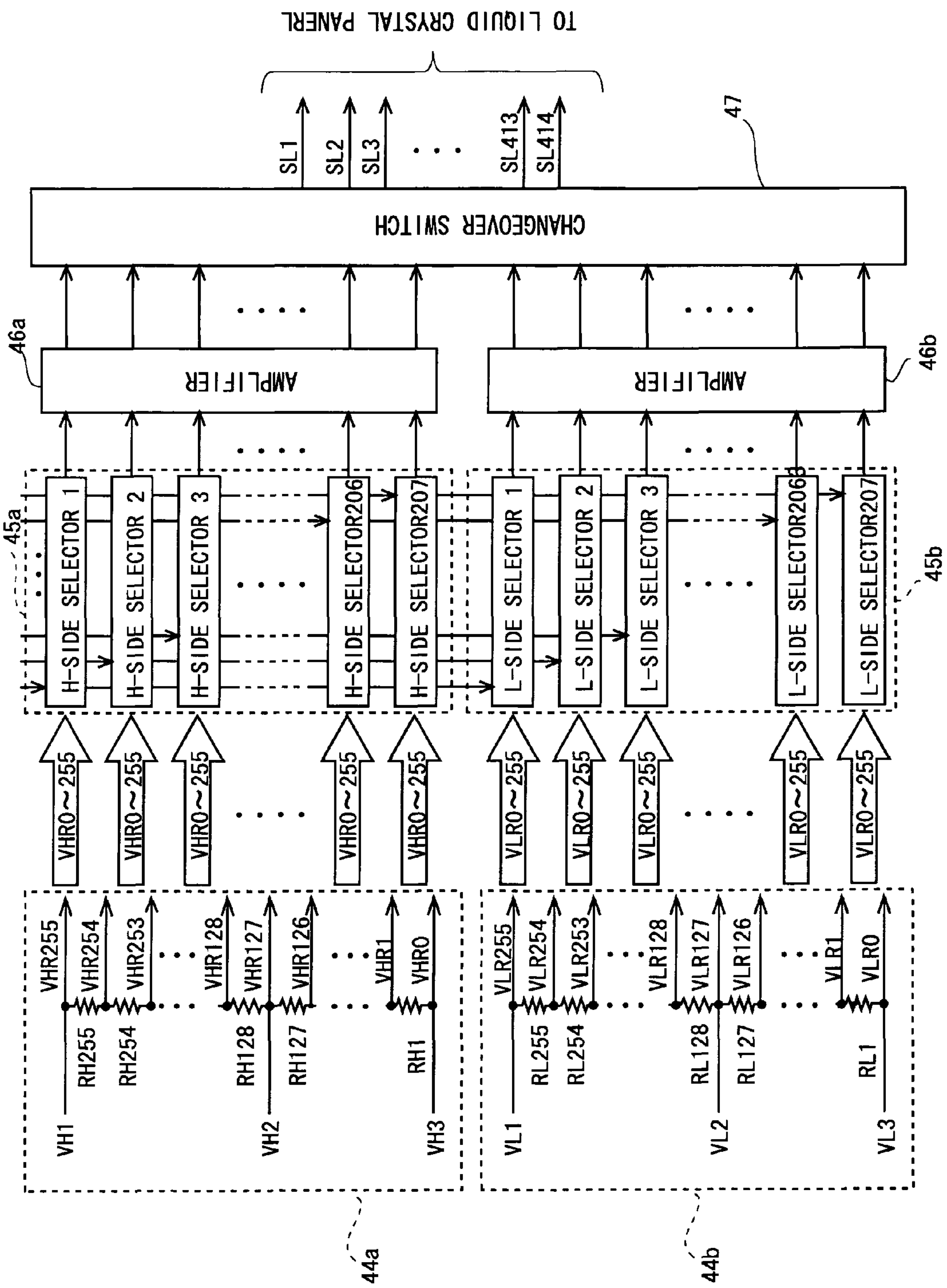
FIG. 6 is a block diagram illustrating configurations of a gradation voltage generation circuit and a selector provided in a 414-output source driver in the embodiment.

FIG. 6 is a block diagram illustrating specific configurations of the gradation voltage generation circuit 44 and the selector 45 provided in the 414-output source driver 400 in the present embodiment. Note that in the following description, the tentative gradation reference voltage and the normal gradation reference voltage will be described as gradation reference voltages without distinction.

First, the gradation voltage generation circuit 44 will be described. The gradation voltage generation circuit 44 has a first voltage dividing circuit 44*a* provided on the VH side for generating a 256-tone gradation voltage group VHR, and a second voltage dividing circuit 44*b* provided on the VL side for generating a 256-tone gradation voltage group VLR. The first and second voltage dividing circuits 44*a* and 44*b* are circuits independent of each other for generating gradation voltages via resistive division, in which 255 resistances RH1 to RH255 or RL1 to RL255 are connected in a series.

The first voltage dividing circuit 44*a* has inputted to one terminal the first VH-side gradation reference voltage (15.2V) VH1 from the reference voltage generation circuit 500, and also has inputted to the other terminal the third VH-side gradation reference voltage (about 8V) VH3. Also, the first voltage dividing circuit 44*a* has the second VH-side gradation reference voltage VH2 inputted to a node between resistances RH128 and RH127 located almost at the center of the circuit. As a result, the first voltage dividing circuit 44*a* subjects the voltages of 15.2V and about 8V applied at the two terminals to resistive division by the 255 resistances, thereby generating the VH-side 256-tone gradation voltage group VHR.

Here, a description is given concerning the reason why the first voltage dividing circuit 44*a* has not only the first and third VH-side gradation reference voltages VH1 and VH3 inputted to the two terminals but also the second VH-side gradation reference voltage VH2 inputted to the node between the resistances RH128 and RH127. Fundamentally, even if the second VH-side gradation reference voltage VH2 is not inputted to the first voltage dividing circuit 44*a*, the 256-tone gradation voltage group VHR is generated by the 255 resistances included in the first voltage dividing circuit 44*a*. However, there are a number of resistances RH0 to RH255, and therefore in some cases, gradation voltages to be outputted from the vicinity of the center of the first voltage dividing circuit 44*a* might deviate from their target voltage values. Therefore, the second VH-side gradation reference voltage VH2 is inputted to a node in the vicinity of the center of the first voltage dividing circuit 44*a*, thereby forcibly causing the voltage at the node to coincide with the second VH-side gradation reference voltage VH2, so that the voltage value for the gradation voltage VHR128 to be outputted from the first voltage dividing circuit 44*a* does not deviate from a target voltage value.

Also, the VH-side gradation voltage group VHR generated by the first voltage dividing circuit 44*a* is inputted to H-side selectors 1 to 207 in a VH-side selector 45*a*. On the other hand, each of the H-side selectors 1 to 207 receives from the second latch circuit 43 an 8-bit digital video signal DV corresponding to the position of a pixel formation portion in the liquid crystal panel 100. Note that in the following description, a column of pixel formation portions connected to the i'th source bus line SL is referred to as the "i'th vertical line". For example, the H-side selector 1 receives a digital video signal DV to be displayed on pixel formation portions (R: red) in the first vertical line of the liquid crystal panel 100, the H-side selector 2 receives a digital video signal DV to be displayed on pixel formation portions (G: green) in the second vertical line, and the H-side selector 3 receives a digital video signal DV to be displayed on pixel formation portions (B: blue) in the third vertical line.

Then, the H-side selectors 1 to 3 each select one gradation voltage VHR(n) corresponding to the digital video signal DV from among the gradation voltage group VHR allowing a 256-tone gradation display, and generate a drive video signal. The generated drive video signals are supplied to the pixel formation portions in the first to third vertical lines via an amplifier 46*a*.

Similarly, the VL-side gradation reference voltages VL1 to VL3 generated by the reference voltage generation circuit 500 are supplied to the second voltage dividing circuit 44*b*. The second voltage dividing circuit 44*b* has inputted to one terminal the first VL-side gradation reference voltage (about 7V) VL1 from the reference voltage generation circuit 500, and also has inputted to the other terminal the third VL-side gradation reference voltage (about 0.2V) VL3. Also, the second VL-side gradation reference voltage VL2 is inputted to a node between resistances RL128 and RL127 located almost at the center of the second voltage dividing circuit 44*b*. As a result, the second voltage dividing circuit 44*b* subjects the voltages of about 7V and about 0.2V applied at the two terminals to resistive division by 255 resistances RL0 to RL255, thereby generating the VL-side 256-tone gradation voltage group VLR.

Also, the second VL-side gradation voltage group VLR generated by the second voltage dividing circuit 44*b* is inputted to the L-side selectors 1 to 207 in a VL-side selector 45*b*. On the other hand, each of the L-side selectors 1 to 207 receives from the second latch circuit 43 an 8-bit digital video signal DV corresponding to the position of a pixel formation portion in the liquid crystal panel 100. For example, the L-side selector 1 receives a digital video signal DV to be displayed on pixel formation portions (R: red) in the fourth vertical line of the liquid crystal panel 100, the L-side selector 2 receives a digital video signal DV to be displayed on pixel formation portions (G: green) in the fifth vertical line, and the L-side selector 3 receives a digital video signal DV to be displayed on pixel formation portions (B: blue) in the sixth vertical line.

Then, the L-side selectors 1 to 3 each select one gradation voltage VLR(n) corresponding to the digital video signal DV from among the gradation voltage group VLR allowing a 256-tone gradation display, and generate a drive video signal. The generated drive video signals are supplied to the pixel formation portions in the fourth to sixth vertical lines via an amplifier 46*b*.

As a result, during a certain horizontal scanning period, the H-side selector 1 inputs the drive video signal to the pixel formation portions in the first of 414 vertical lines of the liquid crystal panel 100, which display video for R, and the L-side selector 1 inputs the drive signal to the pixel formation portions in the fourth vertical line, which display another video for R. During the next horizontal scanning period, a changeover switch 47 is operated so that the H-side selector 1 inputs the drive video signal to the pixel formation portions in the fourth vertical line, and the L-side selector 1 inputs the drive video signal to the pixel formation portions in the first vertical line. Much the same is true on the pixel formation portions in the second and fifth vertical lines for displaying video for G, and the pixel formation portions in the third and sixth vertical lines for displaying video for B.

<2.8 Selector Operations>

Figure 7:
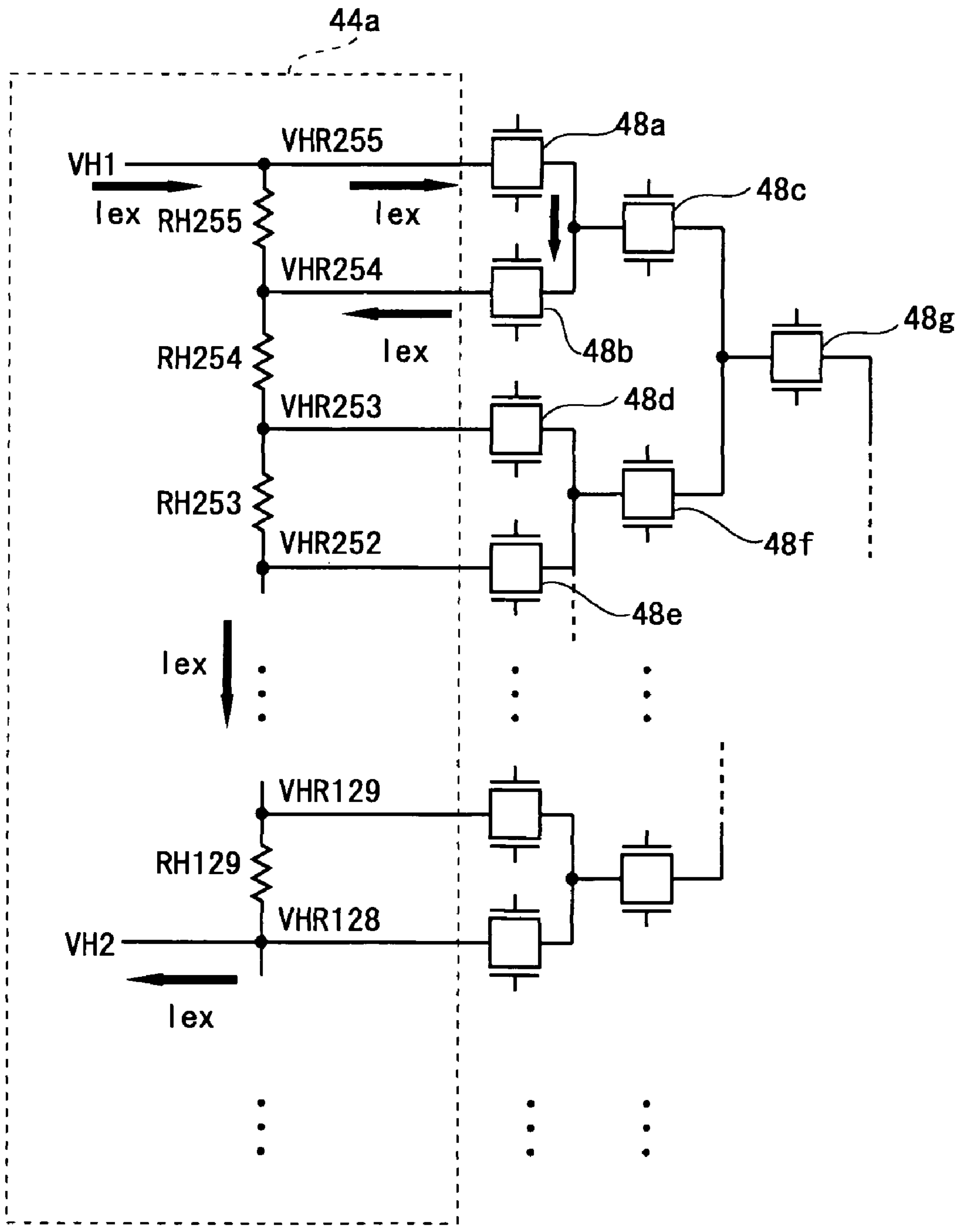
FIG. 7 is a circuit diagram partially illustrating a first voltage dividing circuit and a VH-side selector in the embodiment.

FIG. 7 is a circuit diagram partially illustrating the first voltage dividing circuit 44*a* and the H-side selector 1 of the VH-side selector 45*a* in the present embodiment. The H-side selector 1 has analog switches, which are switching elements, in correlation with the 256-tone gradation voltage group VHR, i.e., the VH-side gradation voltages VHR0 to VHR255 inputted from the first voltage dividing circuit 44*a*, as shown in FIG. 7.

These analog switches are grouped in pairs, and each pair of analog switches are supplied with a digital video signal DV. Each pair of analog switches sequentially repeats selection of any corresponding gradation voltage. Then, a final one gradation voltage VHR(n) or VLR(n) is selected and outputted to a predetermined pixel formation portion of the liquid crystal panel 100. Here, the analog switches are switching elements each having a P-type MOS transistor and an N-type MOS transistor connected source-to-source and drain-to-drain, so that an analog signal is transferred from source to drain or blocked in accordance with the voltage applied to the gate.

The operation of the H-side selector 1 of the VH-side selector 45*a* will be described concretely. The sources of analog switches 48*a* and 48*b* are connected to the terminals for the gradation voltages VH255 and VH254, respectively. The drains of the analog switches 48*a* and 48*b* are connected to the source of an analog switch 48*c*, so that the digital video signal DV from the second latch circuit 43 can be applied to the gates of the analog switches 48*a* and 48*b*, turning on either of the analog switches 48*a* and 48*b*.

Also, the sources of analog switches 48*d* and 48*e* are connected to the terminals for the gradation voltages VH253 and VH252, respectively. The drains of the analog switches 48*d* and 48*e* are connected to the source of an analog switch 48*f*, so that the digital video signal DV from the second latch circuit 43 can be applied to the gate of the analog switches 48*d* and 48*e*, turning on either of the analog switches 48*d* and 48*e*.

Also, the drains of the analog switches 48*c* and 48*f* are connected to the source of an analog switch 48*g*, such that either of the analog switches 48*c* and 48*f* can be turned as well.

For the rest, up to the terminal for the gradation voltage VHR0, each selection portion is formed by a pair of analog switches, so that a final one gradation voltage VHR (n) is selected and outputted from among the 256-tone gradation voltage group VHR in accordance with a digital video signal DV supplied to the gate of the analog switch.

<2.9 Excess Current Generation Mechanism>

The mechanism in which excess current Iex flows through the H-side selector 1 of the VH-side selector 45*a* as described above will be described. When the gradation voltage VH255 of 15.2V is being inputted to the source of the analog switch 48*a*, and the analog switch 48*a* is turned on and measured 15.2V at the drain, the analog switch 48*b* is also measured 15.2V at the drain. At this time, the analog switch 48*b* has also inputted to the source the gradation voltage VH254 which is very close to 15.2V in a steady state. Therefore, the voltage applied between the source and the drain of the analog switch 48*b* is extremely low. On the other hand, voltage proofing between the source and the drain is designed to be approximately 8V considering production cost. Accordingly, in this case, depletion layers formed around the source and the drain do not overlap. Thus, when no voltage is being applied to the gate, no current flows from the drain to the source of the analog switch 48*b*.

However, when the second VH-side gradation reference voltage VH2 rises, the terminal for this voltage is in open state and the voltage is temporarily rendered at the ground voltage GND before rising to a predetermined voltage value. Therefore, for example, if 5V is applied to the source of the analog switch 48*b* with 15.2V at the drain during the transition to the predetermined voltage value, a voltage of about 10V is applied between the source and the drain. This voltage exceeds the designed withstand voltage value 8V between the source and the drain, and therefore depletion layers around the drain and the source of the analog switch 48*b* overlap, so that excess current Iex flows from the drain to the source, i.e., from the terminal for the first VH-side gradation reference voltage VH1 to the terminal for the second gradation reference voltage VH2. Since the first VH-side gradation reference voltage VH1 is generated from the analog power supply voltage VLS, excess current Iex flows between the terminal for the analog power supply voltage VLS and the terminal for the second VH-side gradation reference voltage VH2.

Once excess current Iex started to flow, it continues to flow until the voltage applied between the source and the drain of the analog switch 48*b* falls to or below the designed withstand voltage 8V. Thereafter, the second gradation reference voltage VH2 gradually rises over time, and when it exceeds the withstand reference voltage VBD, the voltage applied between the source and the drain of the analog switch 48*b* falls below the designed withstand voltage 8V. As a result, excess current Iex stops flowing, and the H-side selector 1 starts to operate normally. That is, when all of the first VH-side gradation reference voltage VH1 to the third VL-side gradation reference voltage VL3 satisfy equation (1), excess current Iex stops flowing.

While the mechanism in which excess current Iex flows has been described herein by taking as an example the H-side selector 1 of the VH-side selector 45*a*, the description about the mechanism in which excess current Iex flows is similarly applied to the remaining H-side selectors 2 to 207 and the L-side selectors 1 to 207 of the VL-side selector 45*b*.

Also, while excess current Iex has been described herein as flowing on the VH-side from the terminal for the first gradation reference voltage VH1 to the terminal for the second gradation reference voltage VH2, the above description is similarly applied to the case where excess current Iex flows on the VH-side from the terminal for the first gradation reference voltage VH1 to the terminal for the third gradation reference voltage VH3. In particular, for the terminals for the second and third VH-side gradation reference voltages VH2 and VH3, the voltage applied thereto is temporarily rendered at the ground voltage GND before rising, and therefore in some cases, excess current Iex might flow between the terminal for the analog power supply voltage VLS and the ground terminal.

<2.10 Packaged State of the Liquid Crystal Display Device>

Figure 8:
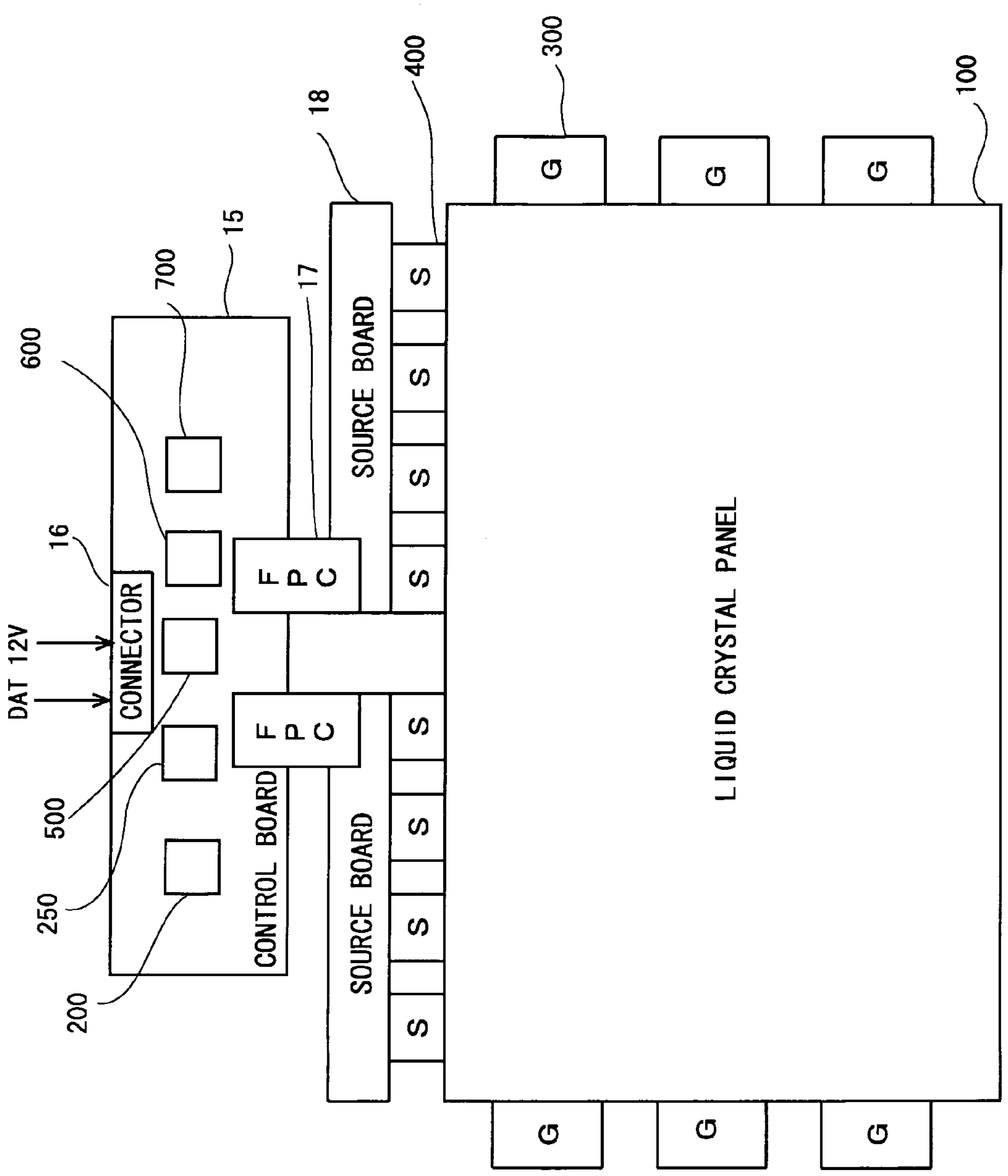
FIG. 8 is a schematic diagram illustrating a packaged state of the liquid crystal display device according to the embodiment.
Figure 9:
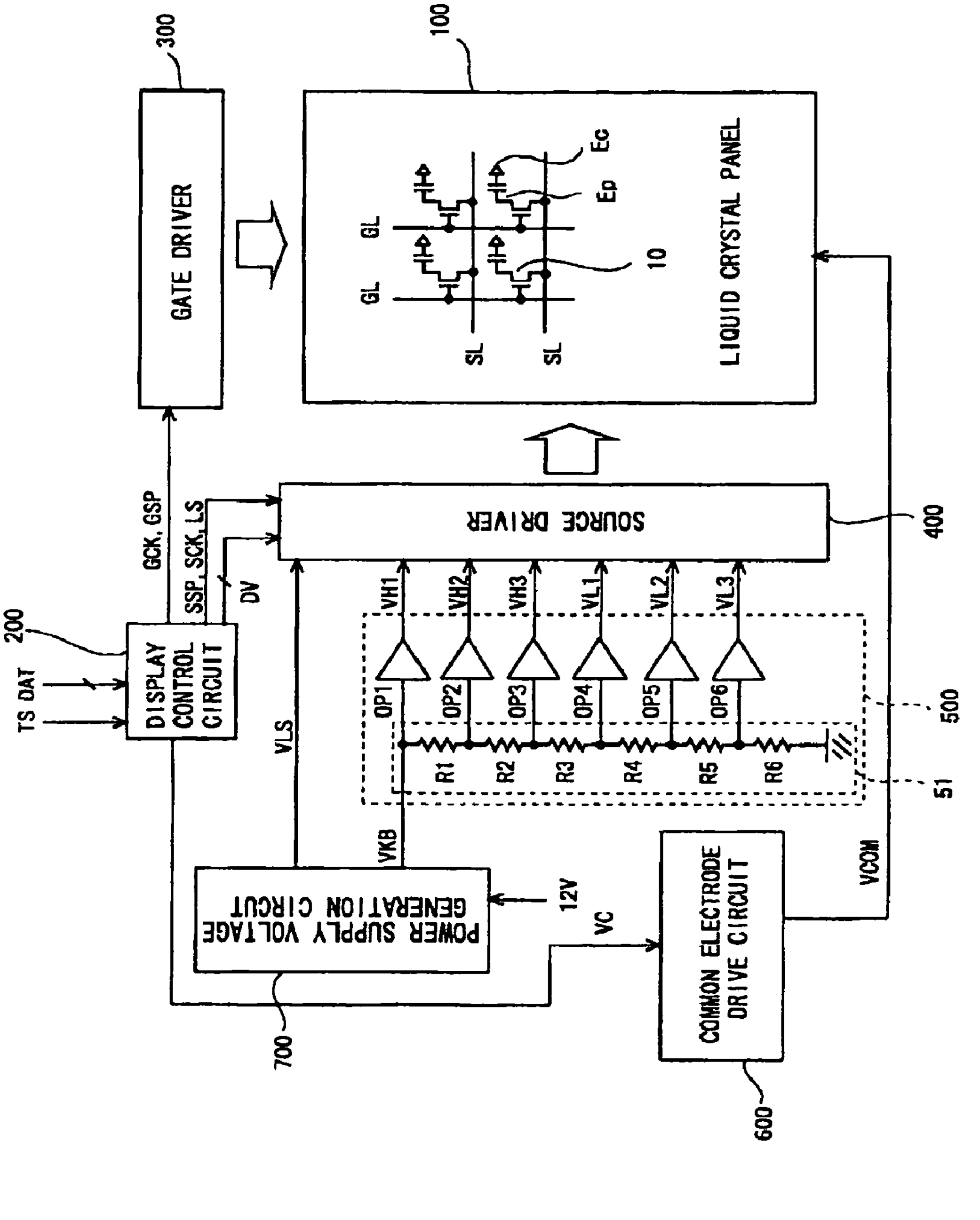
FIG. 9 is a block diagram illustrating the overall configuration of an active-matrix liquid crystal display device in the conventional art.
Figure 10:
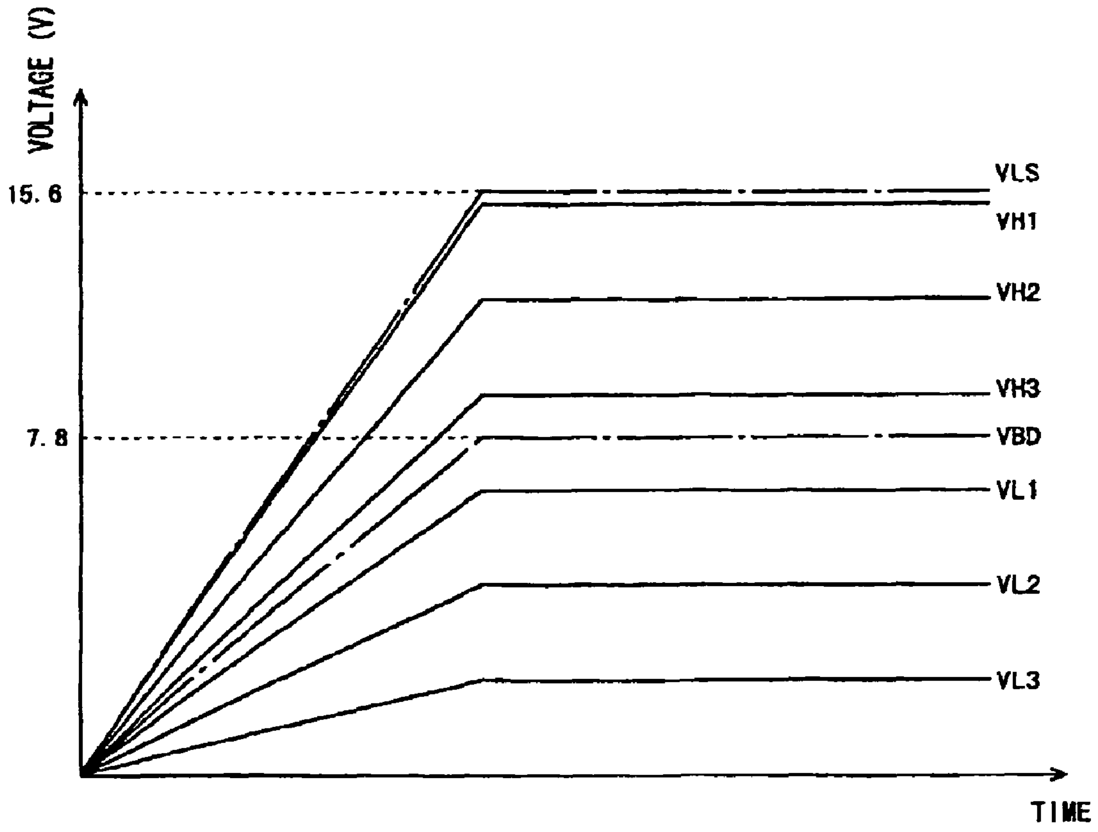
Fig. 10 Conventional Art
FIG. 10 is a graph illustrating over-time changes of gradation reference voltages in the conventional art.

FIG. 8 is a schematic diagram illustrating a packaged state of the liquid crystal display device according to the present embodiment. As shown in FIG. 8, three gate drivers 300 are arranged on each of the right and left sides of the liquid crystal panel 100, and four source drivers 400 are arranged on each of the right and left sides along the top of the liquid crystal panel 100. Two source boards 18 are arranged above the liquid crystal panel 100 so as to be opposed to the liquid crystal panel 100 with respect to the source drivers 400. The source drivers 400 are connected to their respective source boards 18, and each source board 18 is connected to a control board 15 via an FPC (Flexible Print Circuit) 17. The control board 15 has provided thereon the display control circuit 200, the changeover circuit 250, the reference voltage generation circuit 500, the common electrode drive circuit 600, the power supply voltage generation circuit 700, and a connector 16. A reference voltage of 12V and image data DAT are externally supplied to the connector 16, and inputted to the power supply voltage generation circuit 700 and the display control circuit 200, respectively. Circuit power supply voltages VLS and VKB generated in the power supply voltage generation circuit 700 and timing control signals GSP, GCK, SSP, SCK, and LS outputted from the display control circuit 200 for the gate drivers 300 and the source drivers 400 are supplied to the source drivers 400 via the FPCs 17 and the source boards 18. Furthermore, the timing control signals GSP and GCK for the gate drivers 300 are supplied to the gate drivers 300 via wiring in the liquid crystal panel 100. Similarly, digital video signals DV outputted from the display control circuit 200 are supplied to the source drivers 400 via the FPCs 17 and the source boards 18. The timing control signals GSP, GCK, SSP, SCK, and LS outputted from the gate drivers 300 and the source drivers 400 and drive video signals generated from the digital video signals DV in the source drivers 400 are supplied to the liquid crystal panel 100, so that video is displayed on the screen. Note that in FIG. 8, the gate drivers 300 are arranged on the right and left sides of the liquid crystal panel 100 placed to be horizontally long, and the source drivers 400 are arranged on the top of the liquid crystal panel 100, but when the liquid crystal panel 100 is disposed to be vertically long, the source drivers 400 are arranged on the left or right side of the liquid crystal panel 100, and the gate drivers 300 are arranged on the top and bottom of the liquid crystal panel.

<2.11 Effect>

According to the present embodiment, the reference voltage generation circuit 500 for generating the gradation reference voltages VH1 to VL3 includes the voltage dividing circuit 51 having a plurality of resistances connected in a series and the D/A converter 52. Immediately after the liquid crystal display device is powered on, the voltage dividing circuit 51 generates and outputs the tentative gradation reference voltages VHt1 to VLt3. Then, when the D/A converter 52 subjects the gradation voltage data KD supplied from the display control circuit 200 to D/A conversion, thereby generating the normal gradation reference voltages VHn2 to VLn3, the second VH-side tentative gradation reference voltage VHt2 to the third VL-side tentative gradation reference voltage VLt3 are changed over by the changeover circuit 250 to the second VH-side normal gradation reference voltage VHn2 to the third VL-side normal gradation reference voltage VLn3. The reference voltage generation circuit 500 is simply required to rewrite the gradation voltage data KD stored in the register 21 of the D/A converter 52 even when the liquid crystal panel 100 is renewed, and therefore the same control board 15 as before the renewal can be used. Thus, it is possible to save time and cost for recreating the control board 15.

Also, when only the D/A converter 52 is used in the reference voltage generation circuit 500, equation (1) is not satisfied after the power-on of the liquid crystal display device until the second and third VH-side normal gradation reference voltages VHn2 and VHn3 coincide with the withstand reference voltage VBD. Therefore, until the second VH-side normal gradation reference voltage VHn2 to the third VL-side normal gradation reference voltage VLn3 rise, the voltage dividing circuit 51 generates the second VH-side tentative gradation reference voltage VHt2 to the third VL-side tentative gradation reference voltage VLt3, thereby generating the VH-side tentative gradation voltage group VHRt and the VL-side tentative gradation voltage group VLRt. Thereafter, when the generated second VH-side normal gradation reference voltage VHn2 to third VL-side normal gradation reference voltage VLn3 exceed the withstand reference voltage VBD, the second VH-side tentative gradation reference voltage VHt2 through the third VL-side tentative gradation reference voltage VLt3 are changed over to the second VH-side normal gradation reference voltage VHn2 to the third VL-side normal gradation reference voltage VLn3, thereby generating the VH-side normal gradation voltage group VHRn and the VL-side normal gradation voltage group VLRn. Accordingly, even when the D/A converter 52 requires some time to generate the normal gradation reference voltages, the tentative gradation reference voltages may be used provisionally, and after the normal gradation voltages are generated, the tentative gradation reference voltages may be changed over to the normal gradation reference voltages. Thus, even when the liquid crystal panel 100 is renewed, it is possible to perform gamma correction tailored to the renewed liquid crystal panel 100 in a simplified and expeditious manner.

<2.12 Others>

While the display device of the present embodiment has been described as the liquid crystal display device, the present invention is not limited to the liquid crystal display device and is applicable to other display devices. Also, the present embodiment has been described with respect to the liquid crystal display device based on alternating-current drive, but the present invention is not limited to the alternating-current drive, and is applicable to any display device with the gradation reference voltage generation circuit in which equation (1) is not satisfied for some period. Also, the reference voltage generation circuit 500 and the changeover circuit 250 can be formed in a single semiconductor chip. In this case, the display device can be reduced in size, resulting in reduction in production cost.

Industrial Applicability

The present invention is applicable to display devices, such as active-matrix liquid crystal display devices, which provide a gradation display.

The invention claimed is:

1. An active-matrix display device for providing a gradation display of video to be displayed, comprising:

a display portion including a plurality of scanning signal lines, a plurality of video signal lines crossing the scanning signal lines, and a plurality of display elements arranged in a matrix in accordance with intersections between the scanning signal lines and the video signal lines;

a scanning signal line drive circuit for selectively activating the scanning signal lines;

a first reference voltage generation circuit for generating first gradation reference voltages immediately after the display device is powered on, the first gradation reference voltages each having a fixed voltage value;

a second reference voltage generation circuit for generating second gradation reference voltages each having a variable voltage value;

a changeover circuit for, after the generation of the second gradation reference voltages, changing over the first gradation reference voltages inputted from the first reference voltage generation circuit to the second gradation reference voltages inputted from the second reference voltage generation circuit, and outputting the second gradation reference voltages; and a video signal line drive circuit for generating gradation voltages based on either the first or second gradation reference voltages outputted from the changeover circuit, generating an analog video signal by selecting any one of the gradation voltages based on an externally supplied digital video signal, and thereafter outputting the analog video signal to the video signal lines.

2. The display device according to claim 1, further comprising a display control circuit for supplying a timing control signal to the scanning signal line drive circuit, supplying a timing control signal and a digital video signal to the video signal line drive circuit, and holding gradation voltage data being set, wherein, the second reference voltage generation circuit subjects the gradation voltage data outputted from the display control circuit to D/A conversion, thereby generating the second gradation reference voltages.

3. The display device according to claim 2, further comprising a power supply voltage generation circuit for generating a power supply voltage for the video signal line drive circuit and outputting a suspension release signal for releasing operational suspension of the display control circuit after the generation of the power supply voltage, wherein, the display control circuit, when supplied with the suspension release signal, outputs the gradation voltage data being held to the second reference voltage generation circuit.

4. The display device according to claim 1, further comprising a power supply voltage generation circuit for generating a power supply voltage for the video signal line drive circuit, wherein, the first reference voltage generation circuit includes a plurality of nodes formed by connecting a plurality of resistances in a series, and generates the first gradation reference voltages at two or more of the nodes by performing resistive division on a base gradation voltage supplied from the power supply voltage generation circuit.

5. The display device according to claim 4, wherein resistance values for the resistances are averages of resistance values for resistances included in a voltage driving circuit used for driving the display portion.

6. The display device according to claim 4, wherein resistance values for the resistances are the same as those for resistances included in a voltage driving circuit used for driving the display portion.

7. The display device according to claim 1, further comprising a common electrode drive circuit for outputting a common voltage, wherein, the display portion includes a plurality of pixel electrodes provided in the display elements and a common electrode provided in common to the pixel electrodes, the common electrode drive circuit supplies the common voltage to the common electrode, the first gradation reference voltages include first alternating-current gradation reference voltages being gradation reference voltages higher than the common voltage, and second alternating-current gradation reference voltages being gradation reference voltages lower than the common voltage, the second gradation reference voltages include third alternating-current gradation reference voltages being gradation reference voltages higher than the common voltage, and fourth alternating-current gradation reference voltages being gradation reference voltages lower than the common voltage, the gradation voltages include first alternating-current gradation voltages being gradation voltages higher than the common voltage, and second alternating-current gradation voltages being gradation voltages lower than the common voltage, the first alternating-current gradation voltages being generated based on either the first or third alternating-current gradation reference voltages, the second alternating-current gradation voltages being generated based on either the second or fourth alternating-current gradation reference voltages, and the display elements are driven via alternating-current drive by the pixel electrodes and the common electrode, the pixel electrodes having applied thereto either a first or second alternating-current analog video signal generated based on the first or second alternating-current gradation voltages, the common electrode having the common voltage applied thereto.

8. The display device according to claim 1, wherein at least the first reference voltage generation circuit, the second reference voltage generation circuit, and the changeover circuit are formed in a single semiconductor chip.

9. A method for driving an active-matrix display device for providing a gradation display of video to be displayed, the display device being provided with a display portion including a plurality of scanning signal lines, a plurality of video signal lines crossing the scanning signal lines, and a plurality of display elements arranged in a matrix in accordance with intersections between the scanning signal lines and the video signal lines, the method comprising:

a first reference voltage generation step of generating first gradation reference voltages immediately after the display device is powered on, the first gradation reference voltages each having a fixed voltage value;

a second reference voltage generation step of generating second gradation reference voltages later than the first gradation reference voltages, the second gradation reference voltages each having a variable voltage value;

a changeover step of, after the generation of the second gradation reference voltages, changing over the first gradation reference voltages to the second gradation reference voltages, and outputting the second gradation reference voltages;

a gradation voltage generation step of generating gradation voltages based on either the first or second gradation reference voltages being outputted;

a video signal output step of generating an analog video signal by selecting any one of the gradation voltages based on an externally supplied digital video signal, and outputting the analog video signal to the video signal lines; and a scanning signal line activation step of selectively activating the scanning signal lines.

10. The method according to claim 9, further comprising a gradation voltage data output step of outputting gradation voltage data being set from a predetermined register, wherein, in the second reference voltage generation step, the outputted gradation voltage data is subjected to D/A conversion.

11. The method according to claim 10, further comprising a suspension release signal output step of, after generation of a power supply voltage required for generating the analog video signal, outputting a suspension release signal for allowing the gradation voltage data to be outputted, wherein, in the gradation voltage data output step, the gradation voltage data is outputted after the suspension release signal is outputted.

12. The method according to claim 9, further comprising a common voltage output step of outputting a common voltage to a common electrode provided in common to the display elements, wherein, in the first reference voltage generation step, first and second alternating-current gradation reference voltages are generated, the first alternating-current gradation reference voltages being gradation reference voltages higher than the common voltage, the second alternating-current gradation reference voltages being gradation reference voltages lower than the common voltage, in the second reference voltage generation step, third and fourth alternating-current gradation reference voltages are generated, the third alternating-current gradation reference voltages being gradation reference voltages higher than the common voltage, the fourth alternating-current gradation reference voltages being gradation reference voltages lower than the common voltage, in the gradation voltage generation step, first alternating-current gradation voltages being gradation voltages higher than the common voltage are generated based on the first or third alternating-current gradation reference voltages, and second alternating-current gradation voltages being gradation voltages lower than the common voltage are generated based on the third or fourth alternating-current gradation reference voltages, and in the video signal output step, either a first or second alternating-current analog video signal generated based on the first or second alternating-current gradation voltages is outputted to the video signal lines, thereby driving the display elements via alternating-current drive together with the common voltage.

* * * * *